United States Patent [19]

Bohmer

[11] Patent Number: 5,569,556

[45] Date of Patent: Oct. 29, 1996

[54] BATTERY CHARGE INDICATOR

[75] Inventor: William Bohmer, Succasunna, N.J.

[73] Assignee: Display Matrix Corporation, Randolph, N.J.

[21] Appl. No.: 368,269

[22] Filed: Dec. 30, 1994

[51] Int. Cl.⁶ .................................................. H01M 10/48
[52] U.S. Cl. ................................................ 429/91; 429/90
[58] Field of Search ........................................ 429/91, 90

[56] References Cited

U.S. PATENT DOCUMENTS 4,917,973  4/1990  Yoshimoto et al. ...................... 429/91
5,244,754  9/1993  Bohmer et al. ............................ 429/91

FOREIGN PATENT DOCUMENTS 186154  10/1983  Japan ...................................... 429/91

*Primary Examiner*—John S. Maples
*Attorney, Agent, or Firm*—John Q. McQuillan

[57] ABSTRACT

A battery charge indicator is disclosed which accurately displays the true state of charge or energy remaining in an alkaline battery in which the indicator is installed. An alkaline battery cell utilizes a steel can which contains the active chemical ingredients within and provides the conductive surface for the cathode. When the battery is sealed at the open end with a combination plug and anode, the closed end of the steel can becomes distorted or bulged due to internal pressures which are caused by both the expansion of the cathode material due to electrical discharge of the battery and hydrogen gas which accumulates during shelf life in storage. An increase the amount of hydrogen gas occurring during storage creates a distortion or bulge in the center of the closed end of the can. When the battery has been electrically discharged, the cathode material physically expands inside the can causing distortion to extend to the outer periphery of the closed end of the can. The angle between the surface of the closed end of the can at the periphery and the long end or wall of the battery becomes more than ninety degrees. The disclosed battery charge indicator utilizes the distortion or deflection of the periphery of the end portion of the can to move an indicating element to show the degree of discharge of the battery.

24 Claims, 25 Drawing Sheets

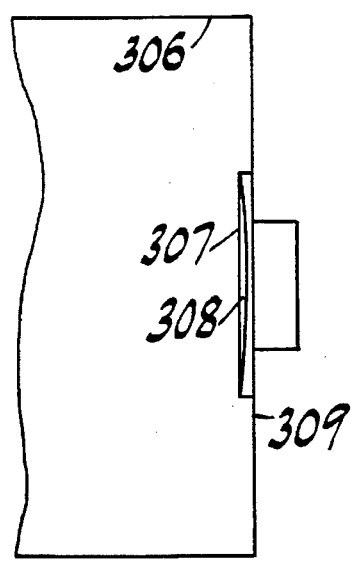
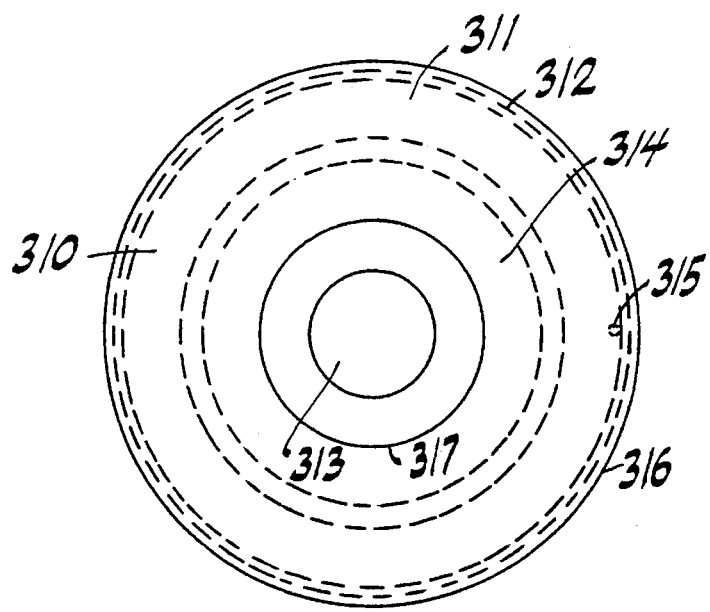
FIG. 41A  FIG. 41B
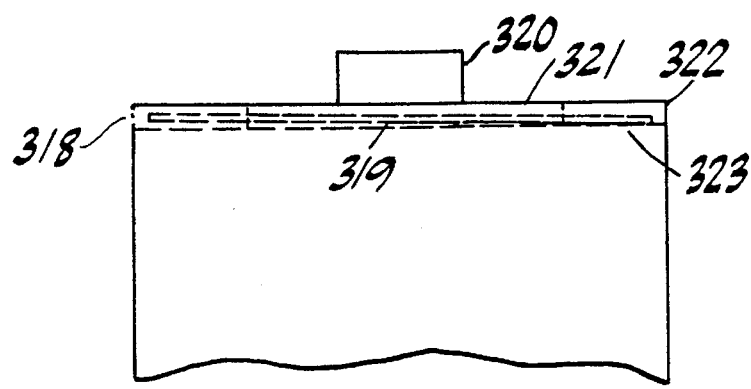
FIG. 41C

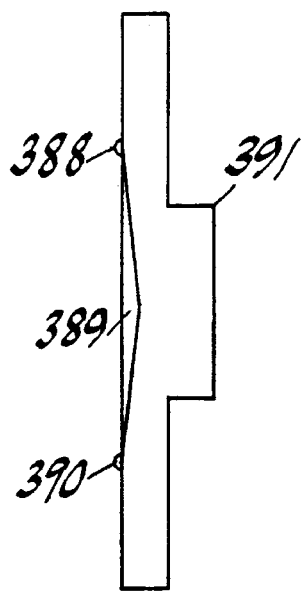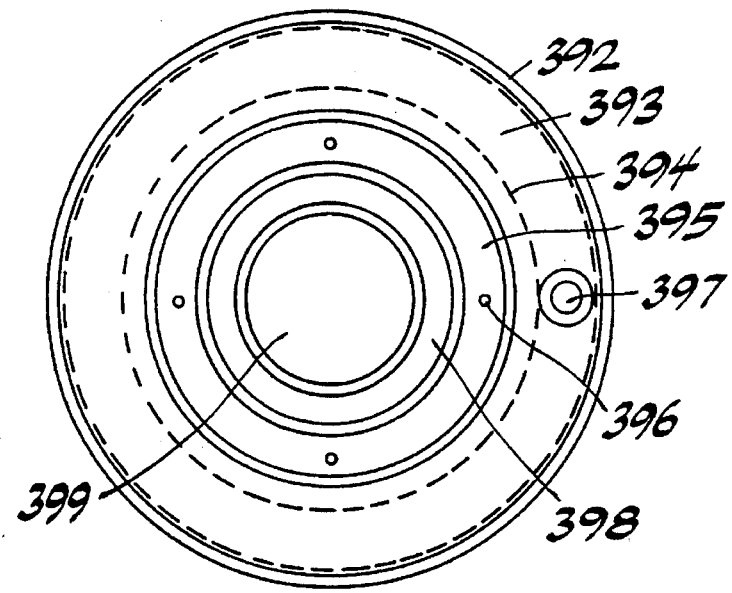
FIG. 47A  FIG. 47B
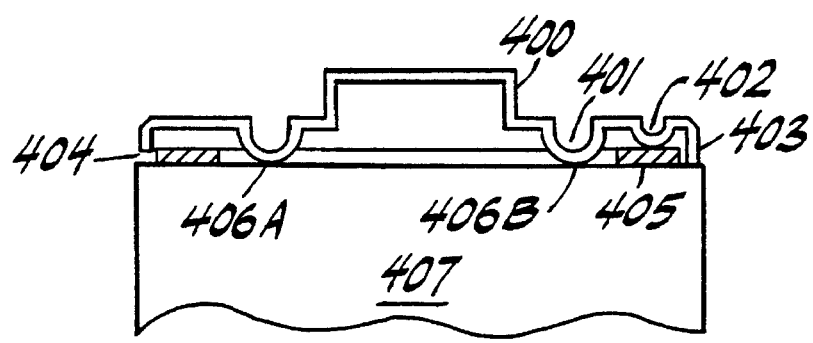
FIG. 47C

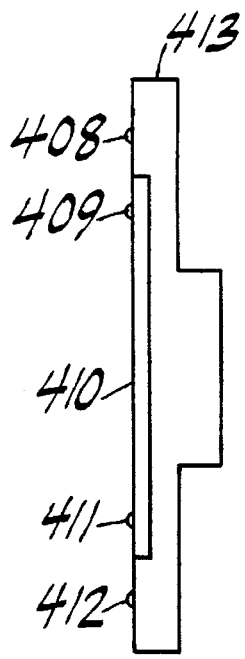
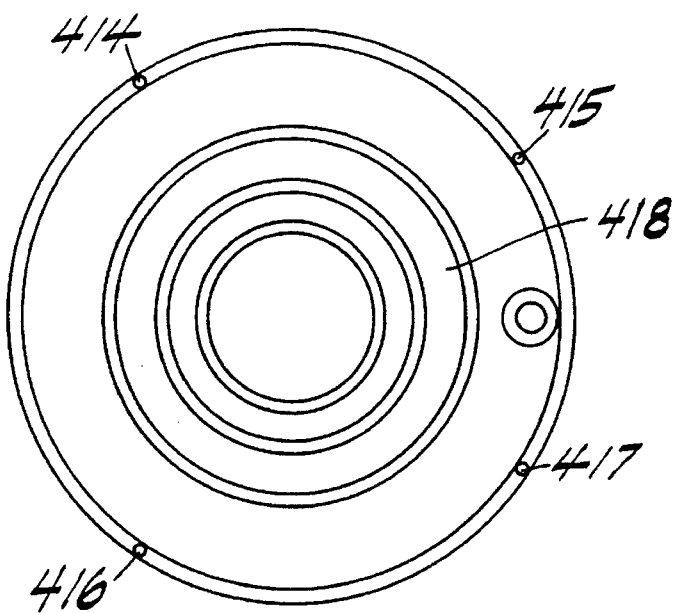
FIG. 48A  FIG. 48B
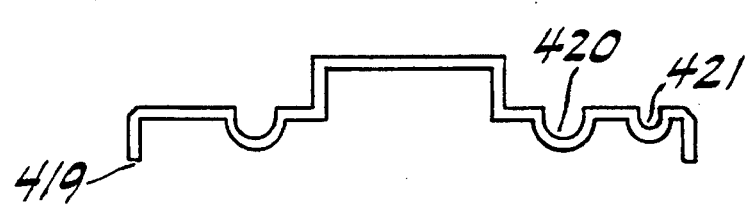
FIG. 48C

BATTERY CHARGE INDICATOR

This invention relates to a battery charge indicator. More particularly, this invention relates to a battery having a battery charge indicator disposed thereon.

BACKGROUND OF THE INVENTION

In order to measure the state of charge of primary batteries, it is usually necessary to measure the current or voltage of the battery under test. The testing of current and voltage is usually performed with external test equipment, such as voltmeters and battery testers. The cost of the associated test equipment or testers varies widely. There are digital multimeters which will measure both voltage and current as well as devices which utilize simple resistor calibrated galvometers. There is also heat sensing material which changes color when the material is heated up by an electrical conductor which is placed across the battery terminals. In all cases of the measurement of a primary battery, it has been necessary to place the battery either in or near the tester and then to initiated the test. in some tester devices, the placing of the battery in the tester itself causes electrical contact to be made with the battery which initiates the test. In other cases, external leads from the tester are connected to the battery terminals to initiate the test. In some cases, the state of charge reading is monitored continuously by the test device, but in most cases it is done briefly in order to provide a quick sampling of the state of charge of the battery.

The principal problem with all of these methods is that na external tester of some kind must be used to measure the state of charge of primary batteries. The battery alone will not render any state of charge information to the user.

In accordance with the disclosure of prior U.S. patents of the applicant, there is provided a battery charge indicator which is comprised of a first means to define a compressible chamber for battery charge indicator which is comprised of a first means to define a compressible chamber for containing a viscous gel and having an outlet therefrom as well as a second means to define a viewing channel of predetermined shape in communication with the outlet of the chamber in order to receive a flow of gel therefrom in an amount corresponding to a predetermined compression of the chamber. The battery charge indicator is incorporated into the battery, such as an alkaline battery, including a housing having an internally contained chemical cathode and anode for generating an electrical current with the cathode expanding in an amount proportional to the total current generated. The battery charge indicator is incorporated in the alkaline battery in such a manner that the compressible chamber is exposed to the cathode for compression thereby in response to an expansion of the cathode.

The cooperation between the battery charge indicator and the alkaline battery is such that when there is an electrical discharge from the battery, the internal components of the battery expand accumulatively as the battery discharges, thereby producing a force which can be used to operate the built-in battery charge indicator in order to indicate the enclosed expansion which is inversely proportional to the remaining electrical charge in the battery. Thus this battery charge indicator operates mechanically to amplify the expansion of the cathode in order to render a continuous sensitive visual state of charge indication. This battery charge indicator is typically installed at one end of the battery as a permanent part of the finished product. Further, this battery charge indicator is constructed in order to produce a visual indication of the state of charge in an analog manner.

SUMMARY OF THE INVENTION

The major component of an alkaline battery cell is the steel can. The steel can contains the active chemical ingredients as well as being the conductive surface for the cathode which makes intimate contact against the inner surface of the can. When the battery is sealed at the open end with a combination plug and anode, the closed end of the steel can becomes very sensitive to internal pressures which are caused by the expansion of the cathode material due to electrical discharge of the battery and the hydrogen gas that accumulates during shelf life in storage. Both of these phenomena cause a distortion or bulging of the closed end of the steel can, resulting in an overall increase in the height of the closed end of the can; however even though the overall result is the same, there is a distinct difference between the distortion or bulge created by electrical discharge and the distortion or bulge created by hydrogen accumulation in storage.

When the battery is first manufacture, there in only a fractional amount of hydrogen gas present inside the steel can which result in none or very little distortion of the closed end of the steel can. The increased amount of hydrogen during storage creates a distortion or bulge at the closed end of the battery with most of the bulge occurring in the cent and with little or none present on the outer perimeter. When the battery has been electrically discharged, there is create additional pressure on the closed end of the battery 109. The pressure generated by electrical discharge is very strong. Since it is the result of the cathode material physically expanding inside the steel can which causes distortion to extend to the outer perimeter. the angle between the surface of the closed end of the can and the long end or wall of the battery becomes more than beyond ninety degrees.

When the battery is manufactured, the center surface and the periphery of the closed end portion of the battery can are as flat. When the battery has been in storage, the surface of the closed end portion assumes a bulge in the center due to accumulation of gas but remains flat on the perimeter surface. The result is that the periphery of the end portion perpendicular to the wall of the battery can even though there is distortion or bulge in the center of the closed end 122. After the battery has been completely discharged. The surface of the closed end portion of the battery can is bulged or distorted in the center and the periphery. The bulging or distortion of the periphery of the end portion of the battery due to electrical discharge and the bulging or distortion due to outgasing can be distinguished by focusing on the periphery of the end portion of the battery can.

When the battery is first manufactured, there is only a fractional amount of hydrogen gas present inside the steel can which results in no distortion of the positive contact formed into the closed end of the battery can. The amount of hydrogen gas increases due to chemical reactions which occur during storage of the battery. The effect of gas in battery cans with the positive contact formed into the closed end is minimal due to the reinforced nature of the stepped construction.

When an alkaline battery is completely discharged, the surface of the periphery the closed end of the battery can is raised as well as the center, thereby creating a nonlinear parabolic slope between the center and the periphery of the surfaced. As a result of the surface having a nonlinear slope, an elongated member attached to the periphery will lift off the surface of the end portion of the can as the periphery of the end portion a bulging which occurs only during electrical discharge. The amount of lift will be proportional to the amount of the bulge of the periphery. This provides a reliable means for indicating electrical discharge of the battery which is independent of any bulging due to accumulation of gas within the can.

BRIEF DESCRIPTION OF THE DRAWINGS

FIG. 41A is a fragmentary elevation view of a substantially discharged single piece battery can showing an indicator window on label;

FIG. 41B is a plan view of a substantially discharged single piece battery can showing a label covering indicator ring;

FIG. 41C is a fragmentary elevation view of a substantially discharged single piece battery can showing a label covering indicator ring;

FIG. 47A is an elevation view of a state of charge positive end cap indicator showing an indicator ring in window;

FIG. 47B is a plan view of a state of charge positive end cap indicator showing indicator ring under end cap;

FIG. 47C is a fragmentary cross section view of a state of charge positive end cap indicator and indicator ring installed on the closed end of a battery can;

FIG. 48A is an elevation view of a state of charge positive end cap indicator; indicator ring in window;

FIG. 48B is a plan view of a state of charge positive end cap indicator;and

FIG. 48C is a section view of a state of charge positive end cap indicator.

DETAILED DESCRIPTION OF THE PREFERRED EMBODIMENTS

The major component of an alkaline battery cell is the steel can. The steel can contains the active chemical ingredients as well as being the conductive surface for the cathode which makes intimate contact against the inner surface of the can. When the battery is sealed at the open end with a combination plug and anode, the closed end of the steel can become very sensitive to internal pressures which are caused by the expansion of the cathode material due to electrical discharge of the battery and the hydrogen gas that accumulates during shelf life in storage. Both of these phenomena cause a distortion or bulging of the closed end of the steel can, resulting in an overall increase in the height of the closed end of the can; however even though the overall result is the same, there is a distinct difference between the distortion or bulge created by electrical discharge and the distortion or bulge created by hydrogen accumulation in storage.

Figure 1:
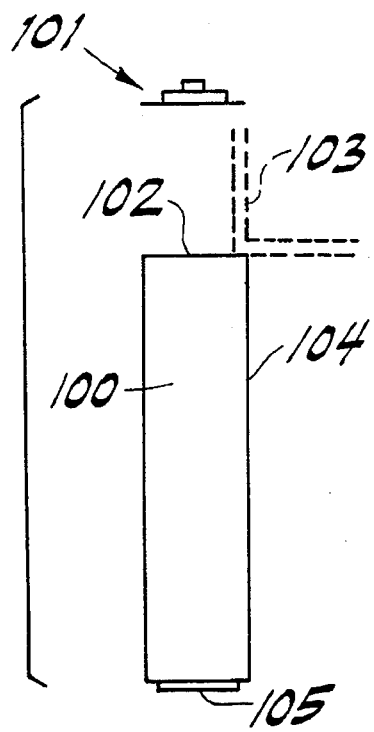
FIG. 1 is an elevation view of a standard two-piece alkaline battery at the time of manufacturer with the positive end cap removed.

FIG. 1 depicts the elevation view of a brand new battery 100 with the positive end cap 101 not installed. The closed end of the steel can 102 is at a right angle 103 in relation to the long side 104 or wall of the can. When the battery is first manufactured, there is only a fractional amount of hydrogen gas present inside the steel can which result in none or very little distortion of the closed end of the steel can 102.

Figure 2:
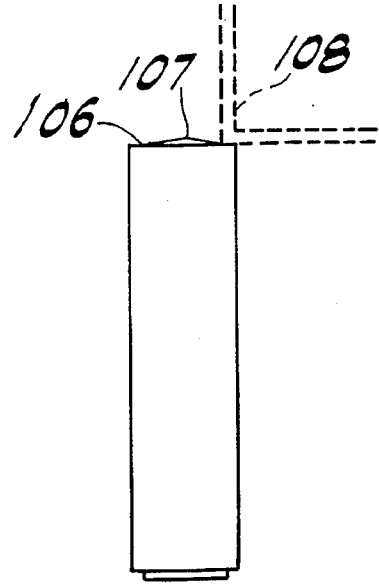
FIG. 2 is an elevation view of a standard two piece alkaline battery after the battery has been in storage.
Figure 3:
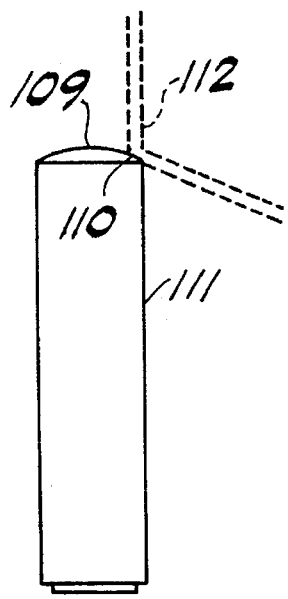
FIG. 3 is an elevation view of a standard two piece alkaline battery after the battery has been totally discharged.

In FIG. 2 the amount of hydrogen gas has increased due to chemical reactions which occur during storage of the battery. The increased amount of hydrogen creates a distortion or bulge at the closed end of the battery with most of the bulge occurring in the center 107 with little or none present on the outer perimeter 106 preserving the ninety degree angle 108. In FIG. 3 the battery has been electrically discharged which creates additional pressure on the closed end of the battery 109. The pressure generated by electrical discharge is very strong. It is a result of the cathode material physically expanding inside the steel can which causes distortion to extend to the outer perimeter 110. The angle between the surface of the closed end of the can 109 and the long end or wall of the battery 111 is now beyond ninety degrees 112.

Figure 4:
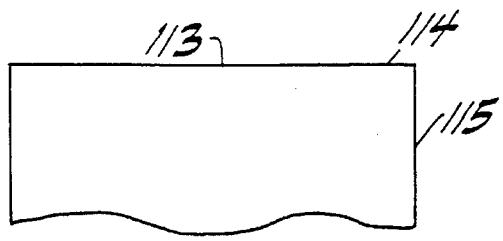
FIG. 4 is a fragmentary elevation view of the closed end of the can of a standard alkaline battery when it is new.

FIGS. 4 through 9 depict the use of an L shaped right angle to measure the flatness of the perimeter surface on the closed end of the battery can. FIG. 4 depicts the closed end of the battery can when it is manufactured. The center surface 113 and the perimeter surface 114 of the closed end of the battery can are flat.

Figure 5:
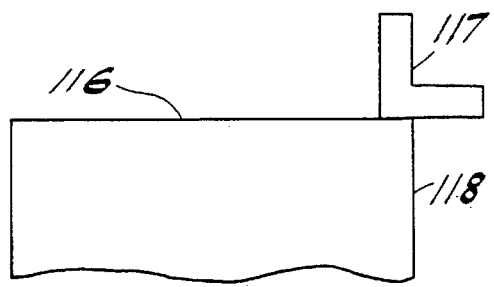
FIG. 5 is a fragmentary elevation view of the closed end of a the case of standard alkaline battery can when it is new and showing the horizontal leg of a right angle positioned on the perimeter of the closed end to demonstrate that the closed end has not been deflected.

In FIG. 5 an L shaped right angle 117 is placed on the perimeter surface of the closed end of the battery can 116. The result is that the horizontal leg of the L shaped right angle 117 is perpendicular to the wall 118 of the battery can.

Figure 6:
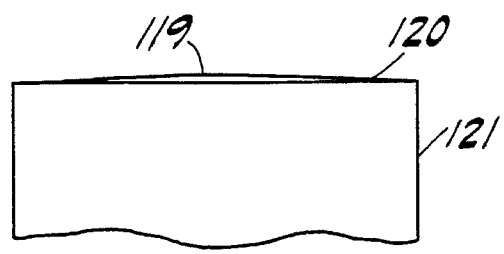
FIG. 6 is a fragmentary elevation view of the closed end of the can of a standard alkaline battery when it has been in storage.

FIG. 6 depicts the closed end of the battery can when it has been in storage. The surface of the closed end assumes a bulge in the center 199 due to accumulation of gas but remains flat on the perimeter surface 120.

Figure 7:
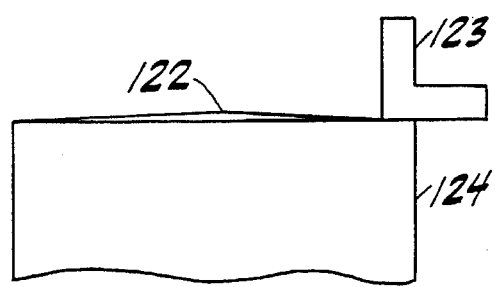
FIG. 7 is a fragmentary elevation view of the closed end of the can of a standard alkaline battery when it has been in storage and showing the horizontal leg of a right angle positional on the perimeter of the closed end to demonstrate that the closed end has not been deflected.

In FIG. 7 an L-shaped right angle 123 is placed on the perimeter surface of the closed end of the battery can 122. The result is that the horizontal leg of the L-shaped right angle 123 remains perpendicular to the wall 124 of the battery can even though there is distortion or bulge in the center of the closed 122.

Figure 8:
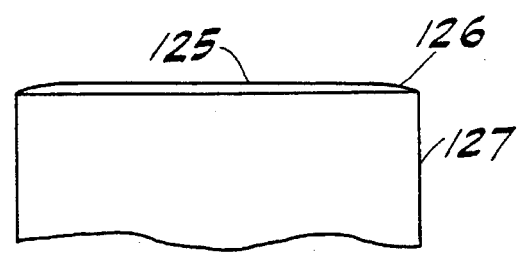
FIG. 8 is a fragmentary elevation view of the closed end of the can of a standard alkaline battery when it has been completely discharged.

FIG. 8 depicts the closed end of the battery can after the battery has been completely discharged. The surface of the closed end of the battery can is now bulging or distorted in the center 125 and the perimeter surface 126.

Figure 9:
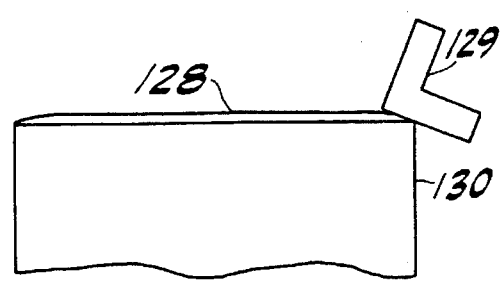
FIG. 9 is a fragmentary elevation view of the closed end of the can of a standard alkaline battery when it has been completely discharged.

In FIG. 9 an L-shaped right angle 129 is placed on the perimeter surface of the battery can 128. The result is that the horizontal leg of the L-shaped right angle 129 is no longer perpendicular to the wall 130 of the battery can. This observation reveals that the bulging or distortion on the closed end of a battery due to electrical discharge and the bulging or distortion due to outgasing can be distinguished by focusing on the perimeter surface of the closed end of the battery can.

Figure 10:
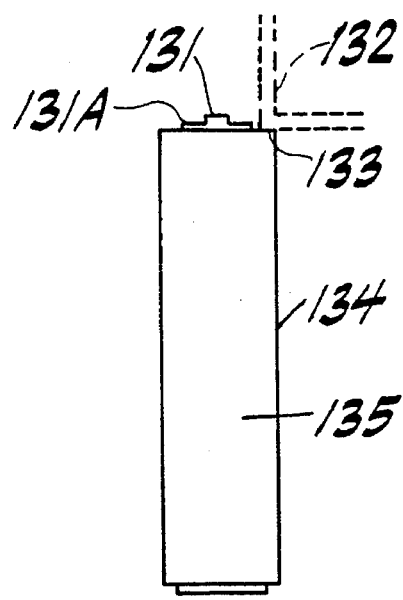
FIG. 10 is an elevation view of a standard one piece alkaline battery when it is new and shows the positive cap formed into the end of the can.

FIG. 10 depicts the elevation view of a battery at manufacture 135 with no separate positive end cap, but with the positive contact 131 which includes a stepped surface 131A and a perimeter surface 133 formed into the closed end as an intregal part of the battery can. The stepped surface 131A and the perimeter surface 133 of the positive contact 131 are at right angles 132 in relation to the long side 134 or wall of the battery can. When the battery is first manufactured, there is only a fractional amount of hydrogen gas present inside the steel can which results in no distortion of the positive contact 131 formed into the closed end of the battery can.

Figure 11:
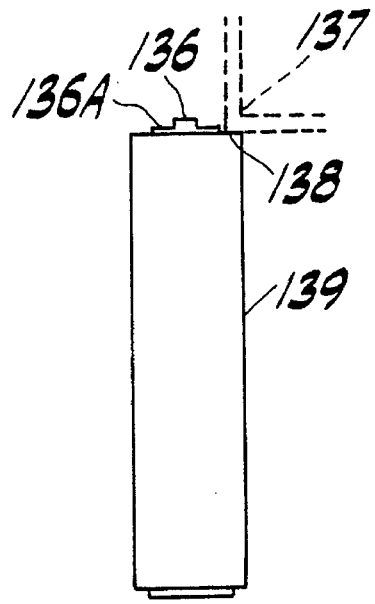
FIG. 11 is an elevation view of a standard one piece alkaline battery and shows the positive cap formed into the end of the can when it has been in storage.

In FIG. 11 the amount of hydrogen gas has increased due to chemical reactions which occur during storage of the battery. The effect of gas in battery cans with the positive contact formed into the closed end is minimal due to the reinforced nature of the stepped construction. The increased amount of hydrogen has little or no effect on the positive contact 136 which includes a stepped surface 136A and a perimeter surface 138 formed into the closed end of the battery can, thus preserving the right angle 137.

Figure 12:
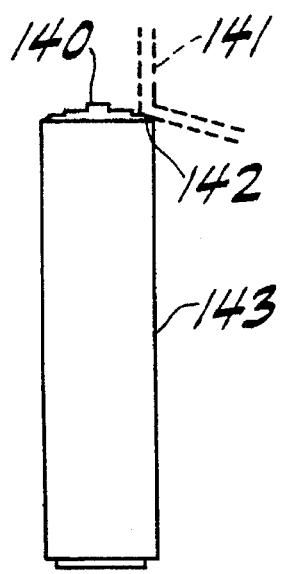
FIG. 12 is an elevation view of a standard one piece alkaline battery when it has been completely discharged and shows the positive cap formed into the end of the can.

In FIG. 12 the battery has been electrically discharged. This creates additional pressure on the closed end of the battery 140. The pressure generated by electrical discharge is very strong in that it is a result of the cathode material physically expanding inside the steel can which causes distortion to extend to the outer perimeter surface 142. The angle between the perimeter surface 142 and the long end or wall of the battery 143 is now beyond ninety degrees 141.

Figure 13:
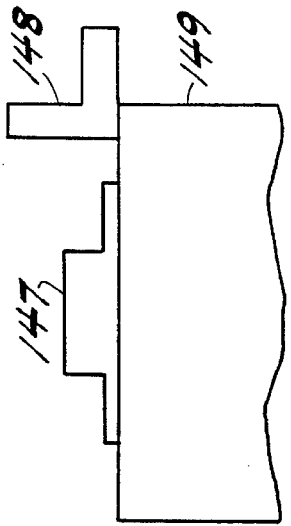
FIG. 13 is a fragmentary elevation view of a battery when the battery is new and shows a positive end cap integral with the can.

FIGS. 13 through 16 depict the use of an L-shaped right angle to measure the flatness of the perimeter surface on the closed end of the battery can. FIG. 13 depicts the closed end of the battery can when it is manufactured. The positive contact 144 which includes a stepped surface 144A and a perimeter surface 145 which is formed into the closed end as an intregal part of the battery can are flat.

Figure 14:
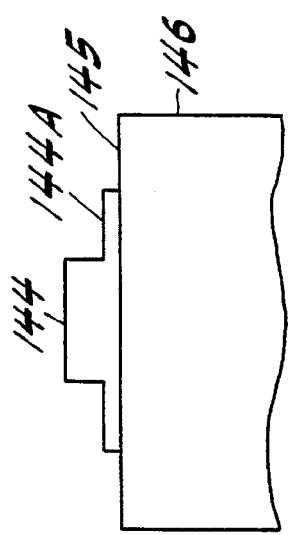
FIG. 14 is a fragmentary elevation view of the formed positive end cap of the battery can when it is new and shows the horizontal leg of a right angle positioned on the perimeter of the closed end.

In FIG. 14 an L-shaped right angle 148 is placed on the perimeter surface of the positive contact 147 formed into the closed end of the battery can. The result is that the horizontal leg of the L shaped right angle 148 is perpendicular to the wall 149 of the battery can.

Figure 15:
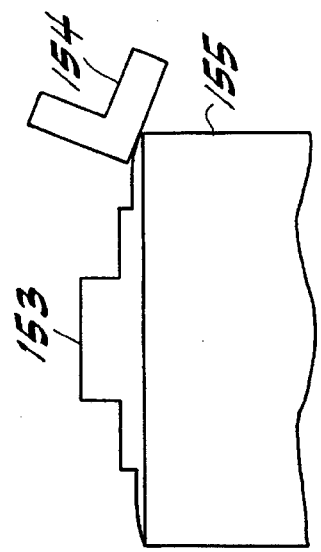
FIG. 15 is a fragmentary elevation view of the battery when it has been completely discharged and shows a positive end cap integral with the can.

FIG. 15 depicts the closed end of the battery can after the battery has been completely discharged. The perimeter surface 151 of the positive contact 150 formed into the closed end of the battery is now bulging.

Figure 16:
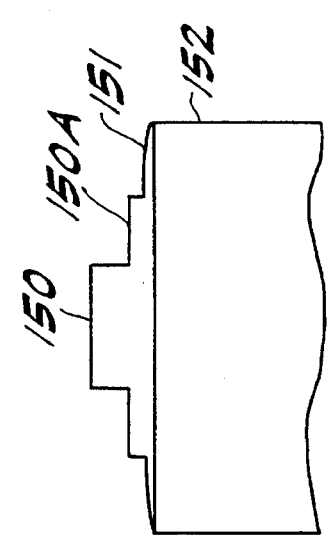
FIG. 16 is a fragmentary elevation view of the formal positive end cap of the can when the battery has been completed discharged and shows the horizontal leg of a right angle positioned on the perimeter of the closed end.

In FIG. 16 an L-shaped right angle 154 is placed on the perimeter surface of the positive contact 153 formed into the closed end of the battery can. The result is that the horizontal leg of the L-shaped right angle 154 is no longer perpendicular to the wall 155 of the battery can. It should be noted that the bulge caused by outgasing is only a factor in regard to the larger two-piece D and C cells which contain a relatively large surface area at the closed end of the battery can. These cells are the two piece variety with the separate positive end cap. Outgasing does not significantly affect the AAA and AA sizes either in the single-piece or two-piece version. The distinct shapes or distortions of the closed end of the battery result in "signatures" which can be used to render devices that will ignore the bulging due to storage and record only the bulging due to true electrical discharge.

Figure 17:
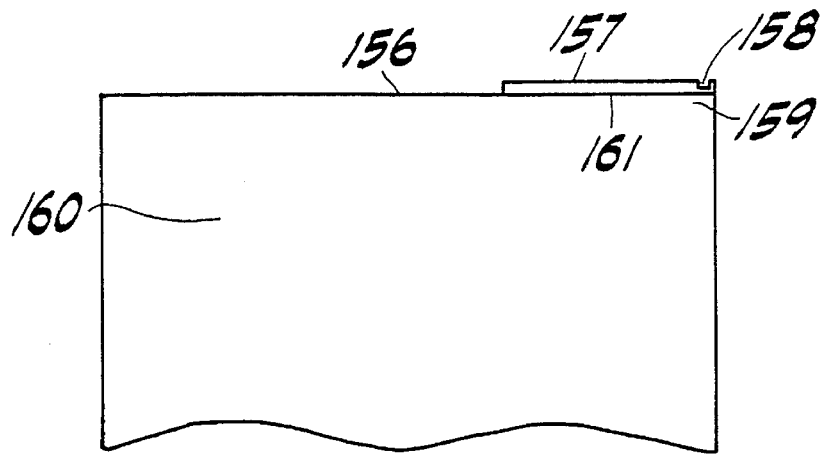
FIG. 17 is an fragmentary elevation view of the closed end of an alkaline battery can at the time of manufacture and shows a flat elongated battery charge indicator member attached to the perimeter of the closed end.
Figure 18:
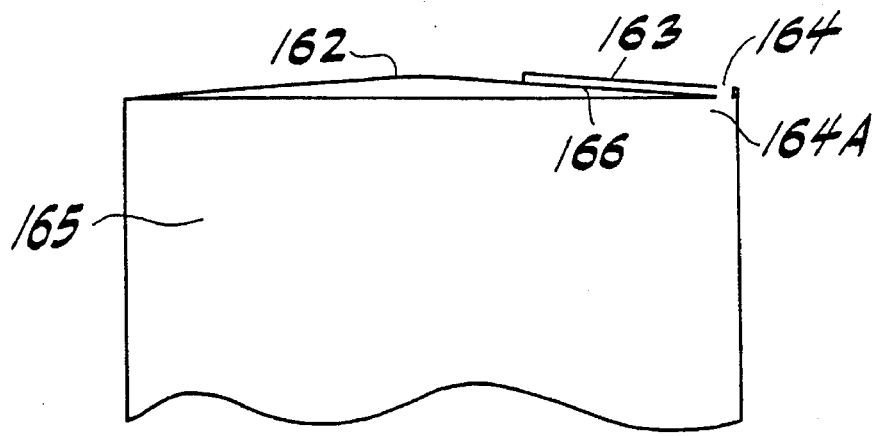
FIG. 18 is a fragmentary elevation view of the closed end of an alkaline battery when the battery begins to discharge and shows a flat elongated battery charge indicator member attached to the perimeter of the closed end.
Figure 19:
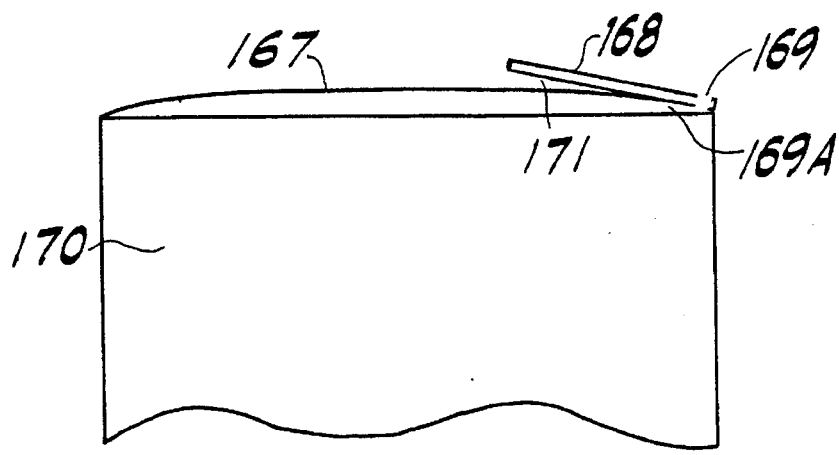
FIG. 19 is a fragmentary elevation view of the closed end of an alkaline battery can when the battery begins to discharge and shows a flat elongated battery charge indicator member attached to the perimeter of the closed end.

FIGS. 17 through 19 demonstrates how a long flat member can indicate battery capacity by placing it on the surface of the closed end of a battery can with the positive end cap removed. The long flat member replaces the right angle device shown in FIGS. 5,7, and 9. FIG. 17 depicts the closed end of a newly manufacture alkaline battery can 160. The surface 156 of the closed end of the battery can 160 is flat. A long flat member 157 is attached at one end 158 to the outer perimeter surface 159 of the closed end of the battery can 156. As a result of the surface being flat, the long flat member 157 makes continuous contact with surface of the closed end of the battery can along the complete length of the long flat member 161.

FIG. 18 depicts the closed end of an alkaline battery can 165 after prolonged storage. The surface 162 of the closed end of the battery can 165 is raised in the center creating a linear slope between the center and the perimeter of the surface. A long flat member 163 is attached at one end 164 to the outer perimeter surface 164a of the closed end of the battery can 165. As a result of the surface having a linear shape, the long flat member 165 makes continuous contact with the surface of the closed end of the battery can along the complete length of the long flat member 166.

FIG. 19 depicts the closed end of an alkaline battery can 165 after it is completely discharged. The surface 167 of the closed end of the battery can 170 is raised in the perimeter as well as the center, creating a nonlinear parabolic slope between the center and the perimeter of the surface. A long flat member 168 is attached at one end 169 to the outer perimeter surface 169a of the closed end of the battery can 170. As a result of the surface having a nonlinear slope, the long flat member 168 no longer makes continuous contact with surface of the closed end of the battery can along the complete length of the long flat member 171, resulting in a gap between the surface 167 and the long flat member 168. The long flat member will only lift off the surface when the perimeter bulges which occurs only during electrical discharge. The amount of lift will be proportional to the amount of perimeter bulge and the length of the long flat member. This provides a reliable means for indicating discharge of the battery while ignoring bulging due to accumulation of gas.

Figure 20:
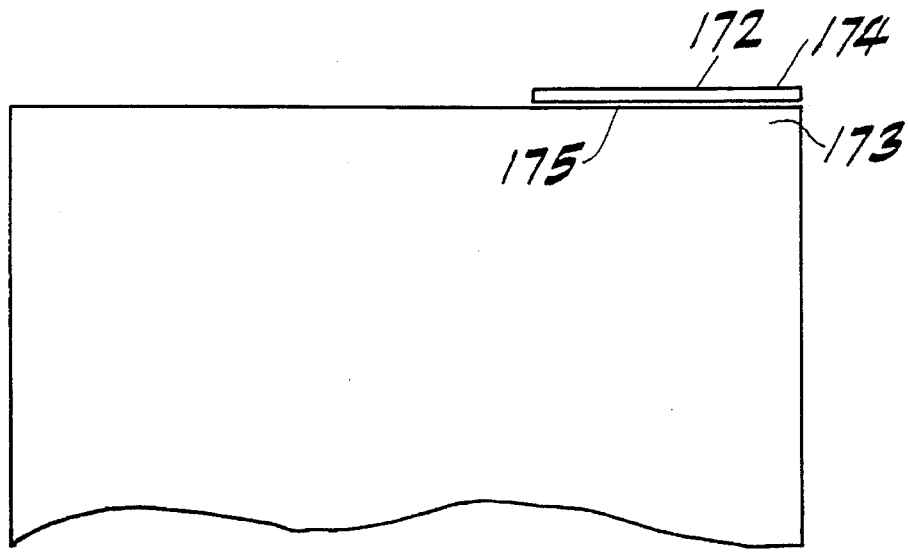
FIG. 20 is a fragmentary elevation view of the closed end of an alkaline battery can at the time of manufacture and shows a flat elongated battery charge indicator member attached to the perimeter of the closed end.
Figure 21:
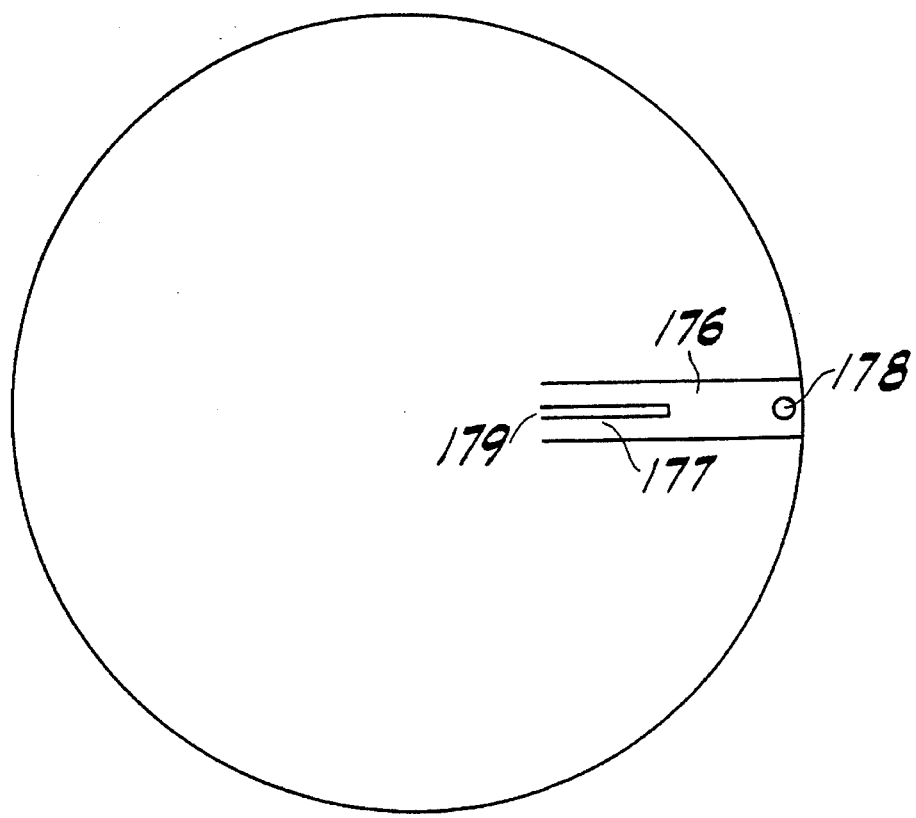
FIG. 21 is a plan view of the closed end of an alkaline battery can at the time of manufacture and shows a flat elongated battery charge indicator member attached to the perimeter of the closed end.

FIGS. 20 through 29 are elevation and plan views of an embodiment of the invention utilizing the method described in FIGS. 17 through 19. FIGS. 20 and 21 are the elevation and plan views, of the battery charge indicator embodiment installed on a battery that is fully charged.

FIG. 20 is an elevation view of an assembly comprised of a rigid flat rectangular slotted indicator guide 172 which contains a thin layer of translucent film 175 that contains a non permanent adhesive on the bottom side of the film and a permanent adhesive on the top side of the film which is adhered to the slotted indicator guide 172. The slotted indicator guide 172 is attached to the perimeter of the battery can 173 at the non-slotted end of the slotted indicator guide 174.

FIG. 21 is a plan view of the same assembly comprised of a rigid flat rectangular slotted indicator guide 176 that contains a thin layer of translucent film 179 that contains a non-permanent adhesive on the bottom side of the film and a permanent adhesive on the top side of the film that is adhered to the slotted indicator guide 176. The slotted indicator guide 176 is attached to the perimeter of the battery can at the non-slotted end of the slotted indicator guide 178. The translucent film 179 is visible in a slot 177 that is cut one end of the slotted indicator guide 176. The translucent film 179 is in intimate contact with the surface of the closed end of the can by means of the non permanent adhesive. The surface of the closed end of the can directly under the film is coated with a dark ink giving the film 179 that is visible in the slot 177 a dark appearance. When the translucent film 179 visible in the slot 177 is completely dark the battery is fully charged.

Figure 22:
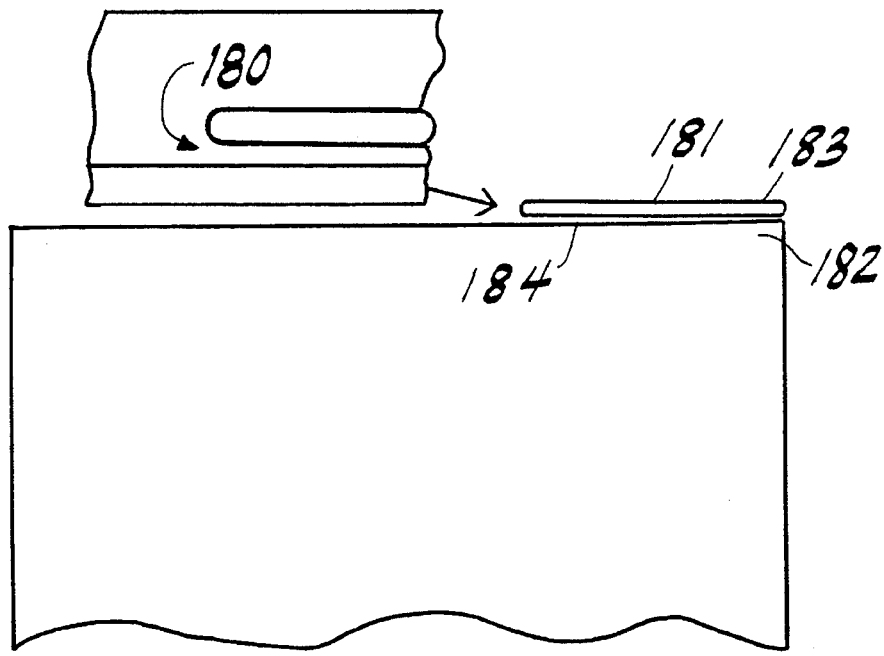
FIG. 22 is a fragmentary elevation view of the closed end of an alkaline battery when the battery begins to discharge and shows a flat elongated battery charge indicator member attached to the perimeter of the closed end.
Figure 23:
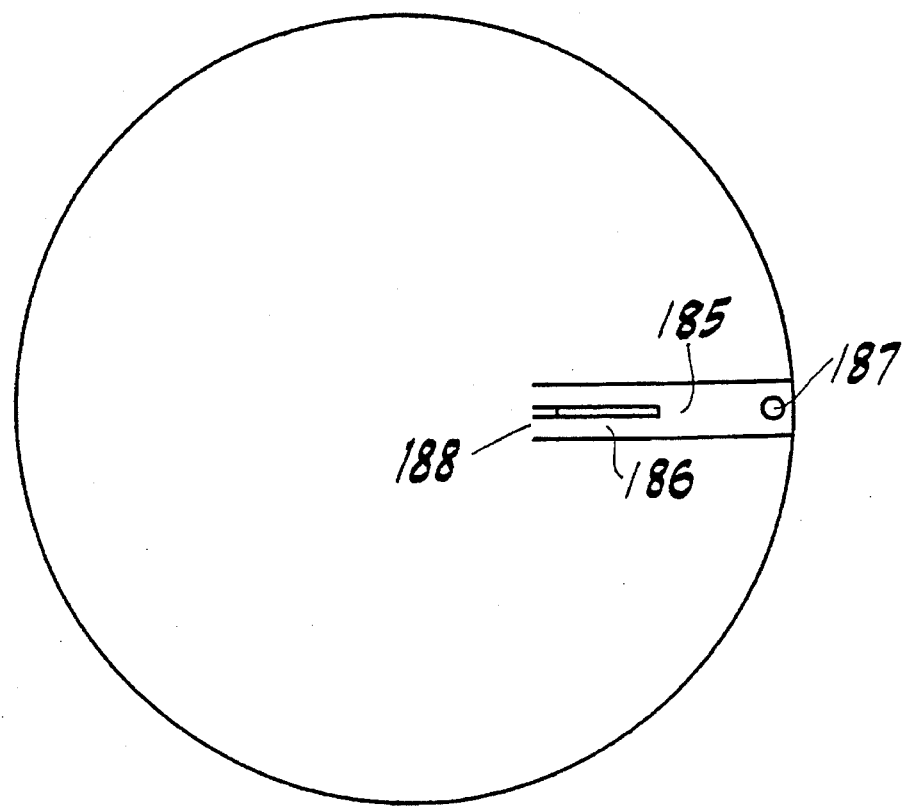
FIG. 23 is a fragmentary elevation view of the closed end of an alkaline battery can when the battery begins to discharge and shows a flat elongated battery charge indicator member attached to the perimeter of the closed end.

FIGS. 22 and 23 are elevation and plan views of the battery charge indicator at the beginning of battery discharge. In FIG. 22 the slotted indicator guide 181, which is attached to the perimeter of the battery can 182 at the non-slotted end of the slotted indicator guide 183, begins to rise at the slotted end of the indicator 180 lifting the translucent film 184 away from the surface of the closed end of the can at the furthest end of the slotted indicator guide.

In FIG. 23 the slotted indicator guide 185 which is attached to the perimeter of the battery can 182 at the non-slotted end of the slotted indicator guide 187, begins to rise at the slotted end of the indicator 186, lifting the translucent film 188 away from the surface of the closed end of the can at the farthest end of the slotted indicator guide, thereby creating an optical contrast where the film is not in intimate contact with the surface of the closed end of the battery can. The resulting contrast is a visually lighter area (the raised portion) becoming visually distinguishable from the darker area (thin film still in contact with the can surface which is stained with a dark background). The result is a contrast ratio proportional to the amount of energy discharged from the battery.

Figure 24:
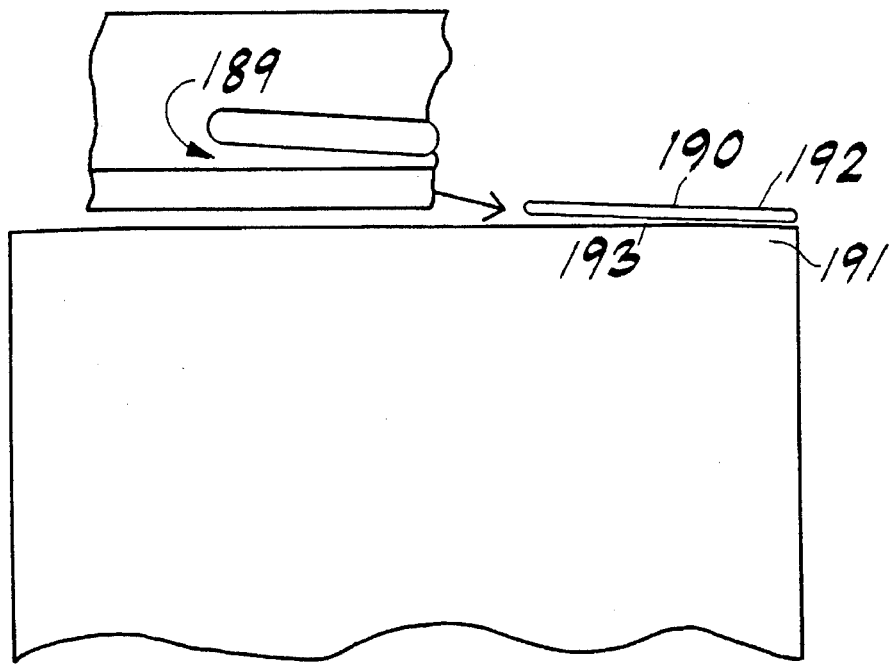
FIG. 24 is a fragmentary elevation view of the closed end of an alkaline battery can as the battery continues to discharge and shows a flat elongated battery charge indicator member attached to the perimeter of the closed end.
Figure 25:
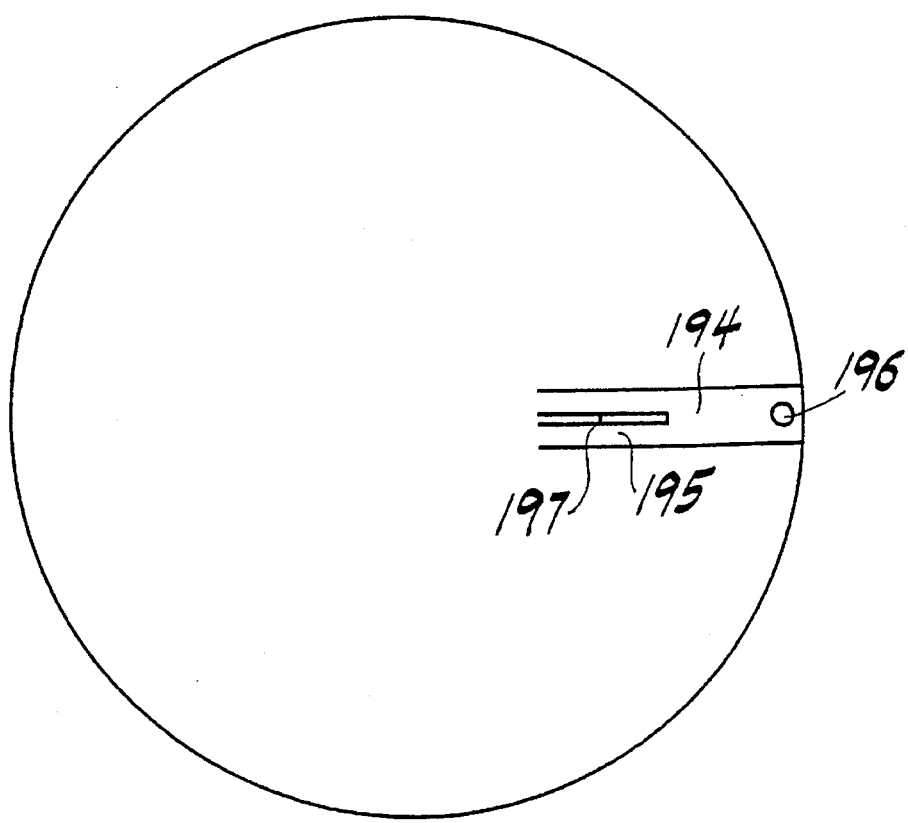
FIG. 25 is a plan view of the closed end of an alkaline battery can as the battery continues to discharge and shows a flat elongated battery charge indicator member attached to the perimeter of the closed end.

FIGS. 24 and 25 are elevation and plan views of the battery charge indicator at the mid point of battery discharge. In FIG. 24 the slotted indicator guide 190 which is attached to the perimeter of the battery can 191 at the non-slotted end of the slotted indicator guide 192 continues to rise at the slotted end of the indicator 189, lifting the translucent film 193 further away from the surface of the closed end of the can at the furthest end of the slotted indicator guide.

In FIG. 25 the slotted indicator guide 194, which is attached to the perimeter of the battery can at the non-slotted end of the slotted indicator guide 196, continues to rise at the slotted end of the indicator 195, thereby lifting the translucent film 197 further away from the surface of the closed end of the can at the furthest end of the slotted indicator guide and creating additional optical contrast where the film is not in intimate contact with the surface of the closed end of the battery can. The resulting additional contrast is a visually lighter area (the raised portion) becoming visually distinguishable from the darker area (the film still in contact with the can surface which is stained with a dark background). The result is a contrast ration proportional to the amount of energy discharged in the battery.

Figure 26:
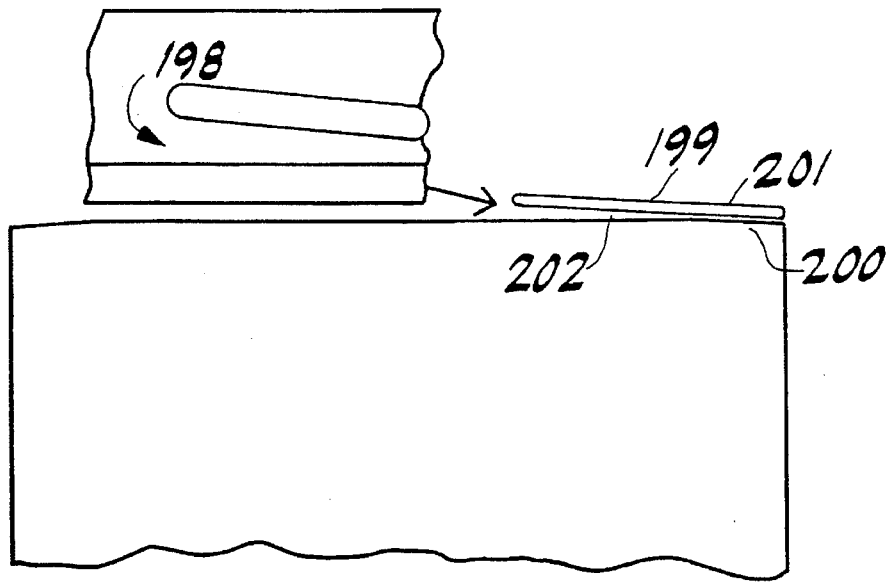
FIG. 26 is a fragmentary elevation view of the closed end of an alkaline battery can as the battery continues to discharge and shows a flat elongated battery charge indicator member attached to the perimeter of the closed end.
Figure 27:
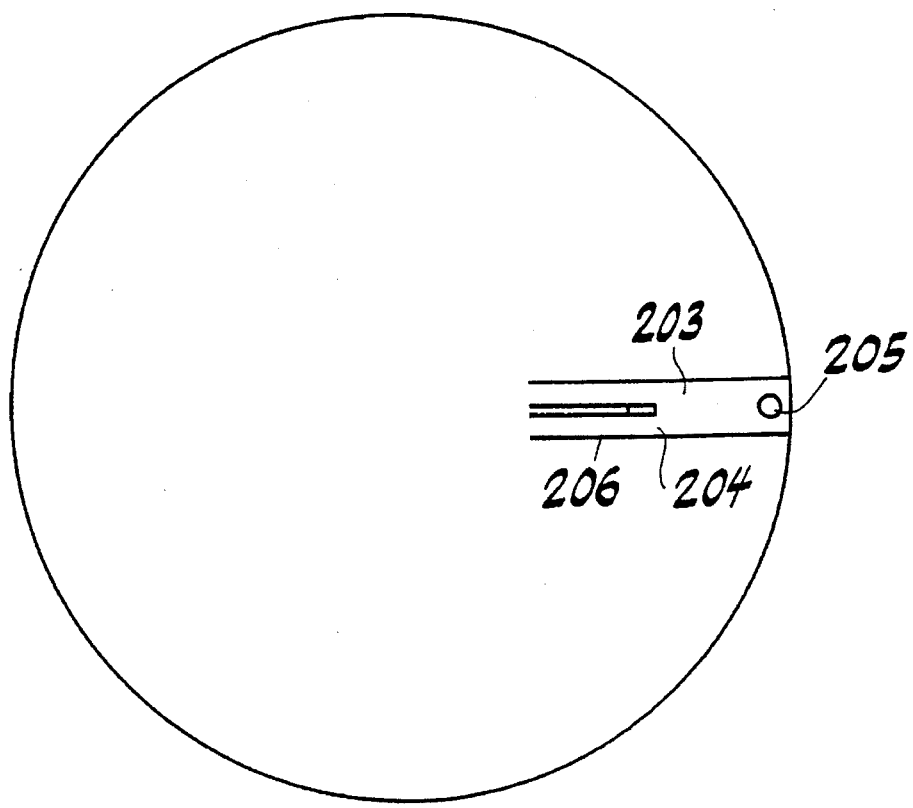
FIG. 27 is a plan view of the closed end of an alkaline battery can as the battery continues to discharge and shows a flat elongated battery charge indicator member attached to the perimeter of the closed end.

FIGS. 26 and 27 are elevation and plan views of the battery charge indicator at the three quarters point of battery discharge. In FIG. 26 the slotted indicator guide 199 which is attached to the perimeter of the battery can 200 at the non-slotted end of the slotted indicator guide 201 continues to rise at the slotted end of the indicator 198, thereby lifting the translucent film 202 further away from the surface of the closed end of the can at the furthest end of the slotted indicator guide. In FIG. 27 the slotted indicator guide 203 which is attached to the perimeter of the battery can at the non-slotted end of the slotted indicator guide 205 continues to rise at the slotted end of the indicator 204, thereby lifting the translucent film 206 further away from the surface of the closed end of the can at the furthest end of the slotted indicator guide and creating additional optical contrast where the film is not in intimate contact with the surface of the closed end of the battery can. The resulting additional contrast is a visually lighter area (the raised portion) becoming visually distinguishable from the darker area (the film still in contact with the can surface which is stained with a dark background). The result is a contrast ratio proportional to the amount of energy discharged from the battery.

Figure 28:
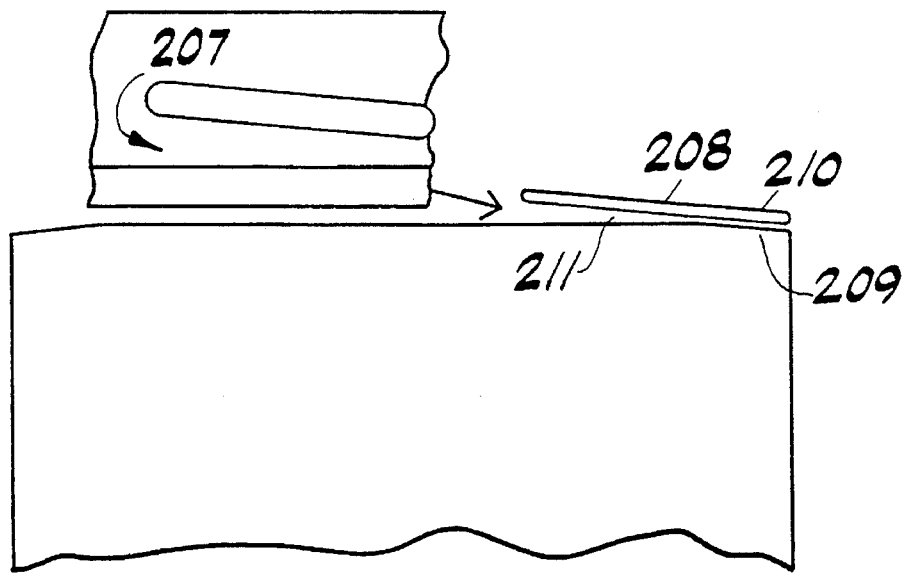
FIG. 28 is a fragmentary elevation view of the closed end of an alkaline battery can when the battery is completely discharged and shows a flat elongated battery charge indicator member attached to the perimeter of the closed end.
Figure 29:
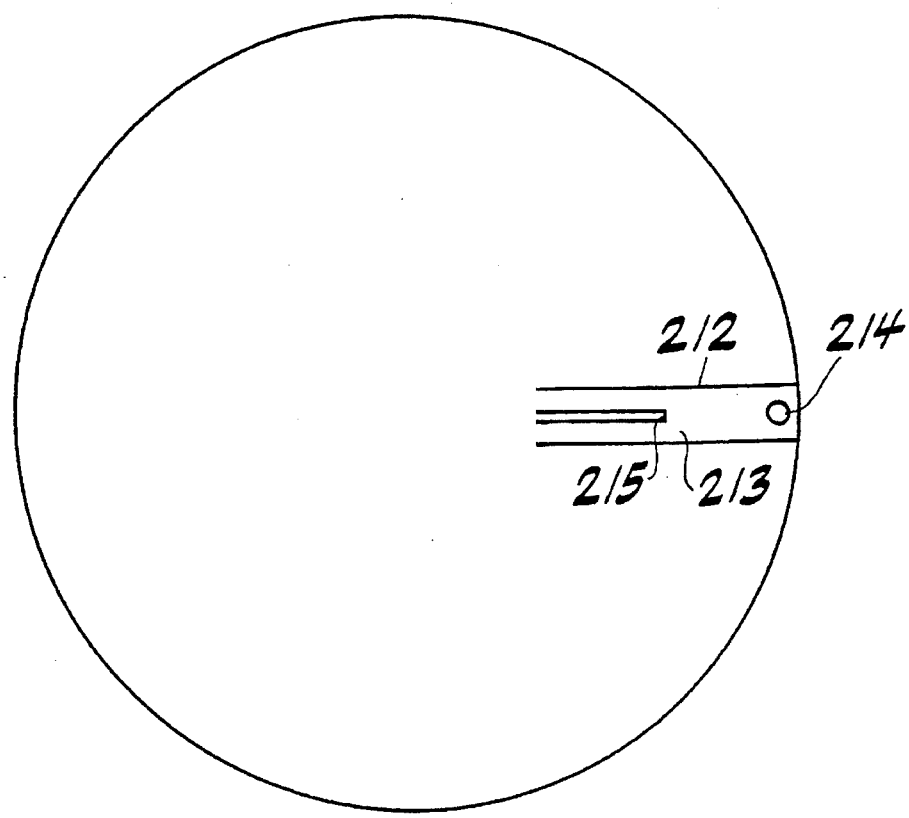
FIG. 29 is a plan view of the closed end of an alkaline battery can when the battery is completely discharged and shows a flat elongated battery charge indicator member attached to the perimeter of the closed end.

FIGS. 28 and 29 are elevation and plan views of the battery charge indicator at the completion of battery discharge. In FIG. 28 the slotted indicator guide 208 which is attached to the perimeter of the battery can 209 at the non-slotted end of the slotted indicator guide 210 completes rising at the slotted end of the indicator 207, thereby lifting the translucent film 211 further away from the surface of the closed end of the can at the furthest end of the slotted indicator guide. In FIG. 29 the slotted indicator guide 212 which is attached to the perimeter of the battery can at the non-slotted end of the slotted indicator guide 214 completes rising at the slotted end of the indicator 213, thereby lifting the translucent film 215 completedly away from the surface of the closed end of the can at the furthest end of the slotted indicator guide, eleminating all remaining optical contrast which is proportional to the amount of energy discharged from the battery.

Figure 30:
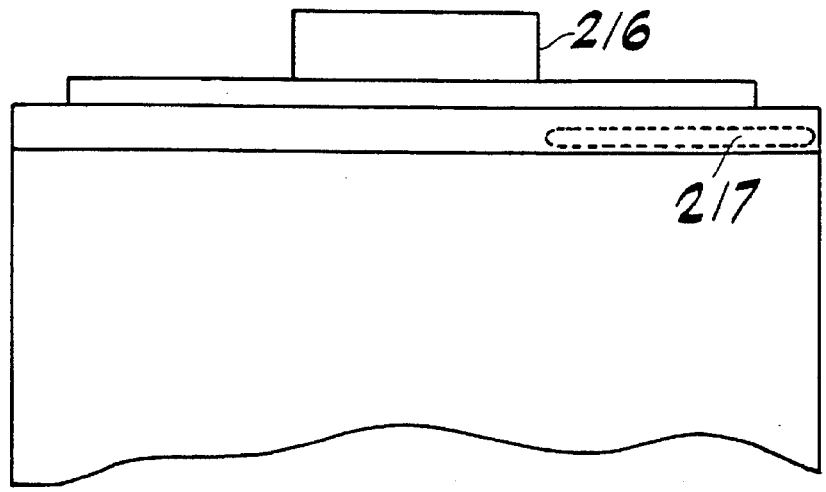
FIG. 30 is a fragmentary elevation view of an alkaline battery can with a flat elongated battery charge indicator member attached to the perimeter of the closed end with a positive end cap contact assembly installed on the battery.
Figure 31:
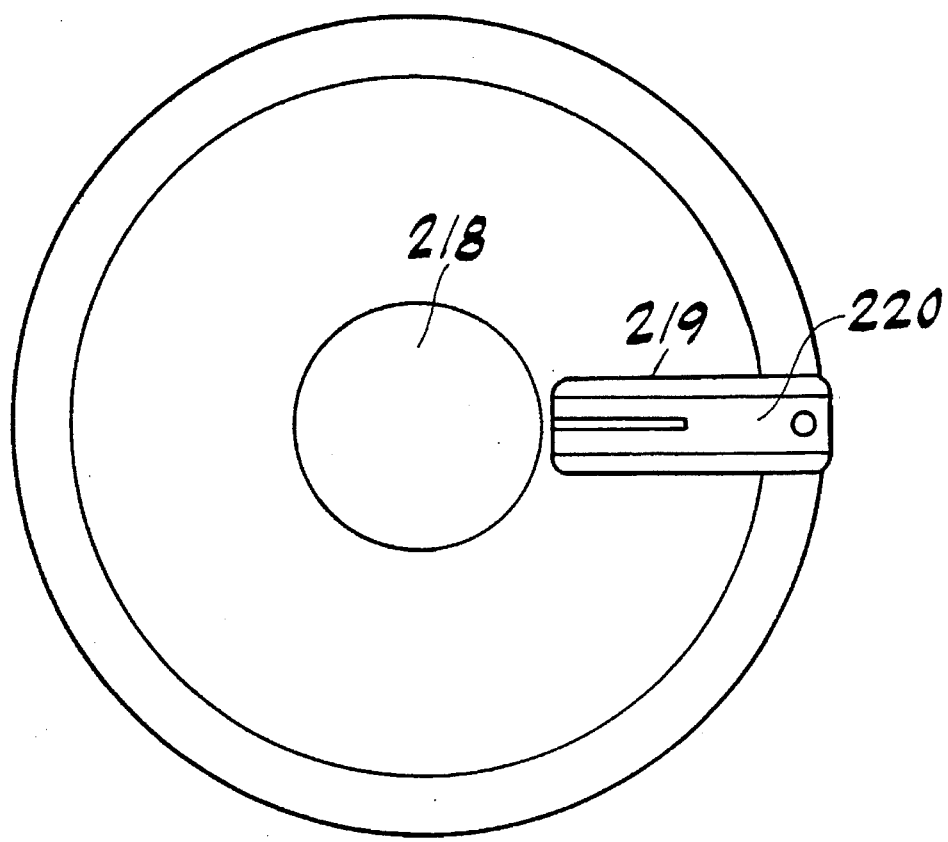
FIG. 31 is a plan view of an alkaline battery can with a flat elongated battery charge indicator member attached to the perimeter of the closed end and a positive end cap contact assembly with viewing window installed on the battery.

FIGS. 30 and 31 are elevation and plan views of the battery charge indicator described in FIGS. 20 through 29 with a positive end cap installed on the closed end of the battery can. As shown in FIGS. 30 and 31, the positive end cap 216 provides the necessary standard positive contact and also protects the battery charge indicator component 217 from being disturbed when the battery is handled or installed in battery operated devices.

Figure 32A:
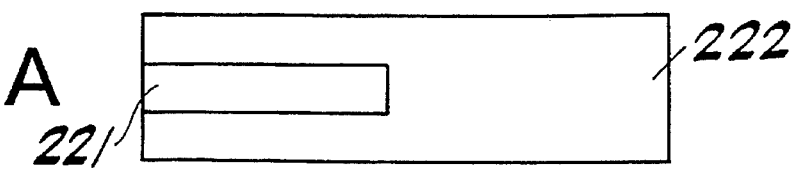
FIG. 32A is a plan view of a flat elongated battery charge indicator using a translucent film as an optical indicia.
Figure 32B:
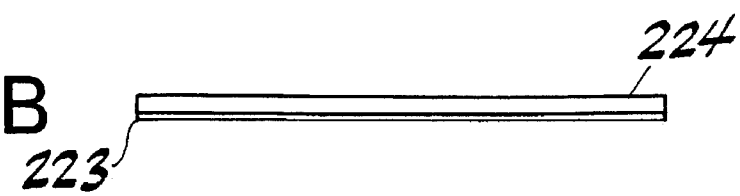
FIG. 32B is a section view of a flat elongated battery charge indicator using a translucent film as an optical indicia.

FIGS. 32A through 35B are plan and elevation views of various types of indicating means attached to the slotted indicator guide. FIG. 32A is a plan view of the slotted indicator guide 222 with a translucent film 221 installed on the bottom. FIG. 32B is an elevation view of the same slotted indicator guide 224 with the translucent film 223 installed on the bottom.

Figure 33A:
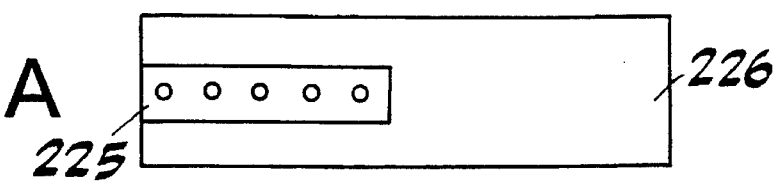
FIG. 33A is a plan view of a flat elongated battery charge indicator using a series of apertures as an optical indicia.
Figure 33B:
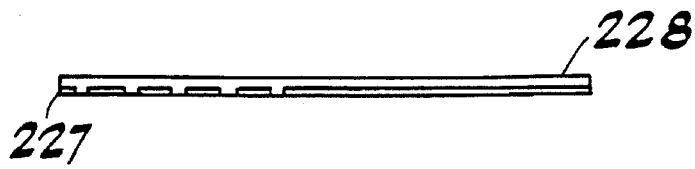
FIG. 33B is section view of a flat elongated battery charge indicator using a series of apertures as an optical indicia.

FIG. 33A is a plan view of the slotted indicator guide 226 with an aperture sheet 225 installed on the bottom. FIG. 33B is an elevation view of the same slotted indicator guide 228 with the aperture sheet 227 installed on the bottom. In this embodiment the apertures will rise as the battery discharges rendering a sequential lifting of the apertures. As each aperture lifts, the area on the surface of the closed end of the battery can that can be seen through the aperture is no longer restricted to the size of the aperture. If the surface directly under the aperture is one color and the surface around the aperture is another color a visual contrast will exist between the apertures that have lifted and the apertures that have not. The number of apertures lifted in relation to the number of apertures that have not is in direct relation to the amount of energy remaining in the battery.

Figure 34A:
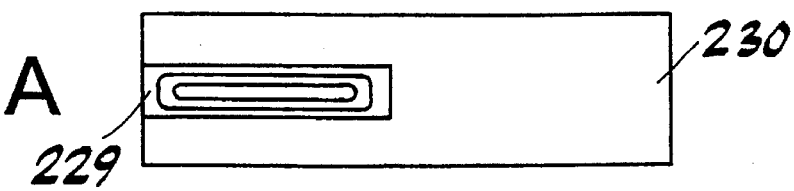
FIG. 34A is plan view of a flat elongated battery charge indicator using a lens as an optical indicia.
Figure 34B:
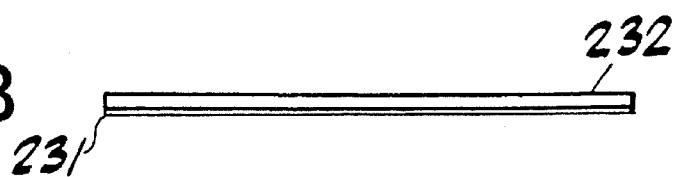
FIG. 34B is a section view of a flat elongated battery charge indicator using a lens as an optical indicia.

FIG. 34A is a plan view of the slotted indicator guide 230 with a low profile lens 229 installed on the bottom. FIG. 34B is an elevation view of the same slotted indicator guide 232 with the low profile lens 231 installed on the bottom. In this embodiment a pattern is printed on the surface of the closed end of the battery can. As the battery discharges, the lens rises off the surface increasing the optical magnification of the printed pattern. The amount of magnification of the printed pattern is in direct relation to the amount of energy remaining in the battery.

Figure 35A:
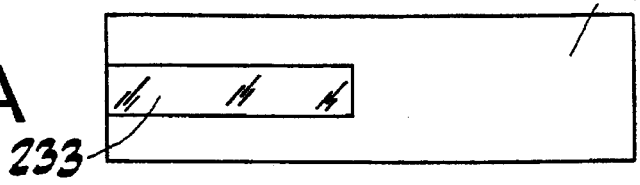
FIG. 35A is a plan view of a flat elongated battery charge indicator using a color filter as an optical indicia.
Figure 35B:
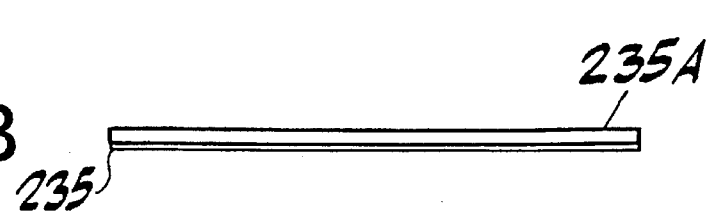
FIG. 35B is a section view of a flat elongated battery charge indicator using a color filter as an optical indicia.

FIG. 35A is a plan view of the slotted indicator guide 234 with a colored transparent filter 233 installed on the bottom. FIG. 35B is an elevation view of the same slotted indicator guide 235a with the color transparent filter 235 installed on the bottom. In this embodiment a color is coated on the surface of the closed end of the battery can. The color of the filter is another color which when positioned on the colored surface, creates a third color which is visible when the slotted indicator guide is flush with the surface. As the battery discharges, the colored filter rises off the surface enabling the filter color to be seen in isolation in contrast to the mixed color area still in contact with the colored surface. The amount of color contrast is in direct relation to the amount of energy remaining in the battery.

Figure 36A:
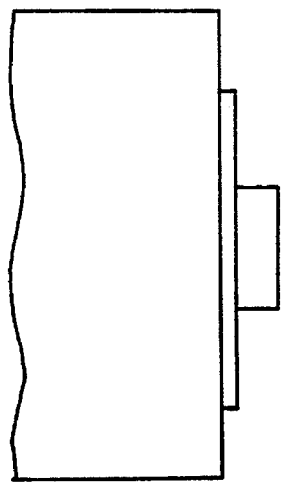
FIG. 36A is a fragmentary elevation view of a single piece battery can.
Figure 36B:
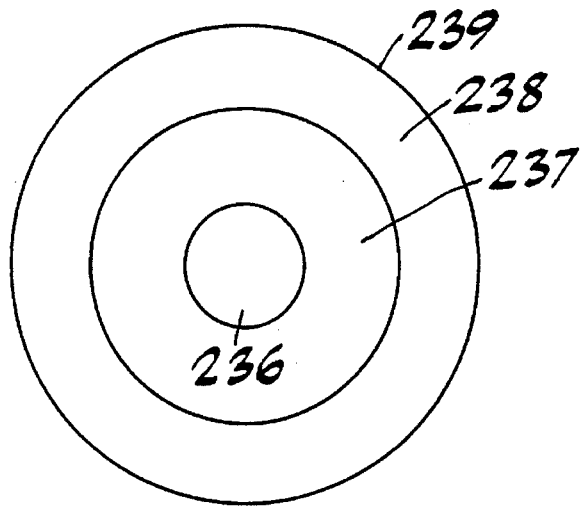
FIG. 36B is a plan view of single piece battery can.
Figure 36C:
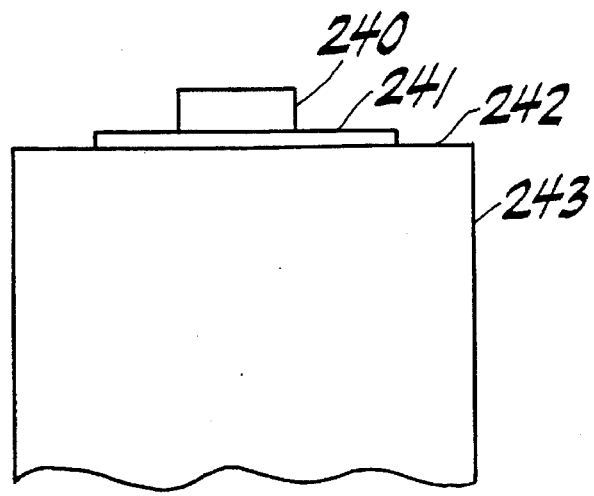
FIG. 36C is a fragmentary elevation view of a single piece battery can.

FIGS. 36A, 36B and 36C are three different views a single piece battery can depicting the typical three level shape formed into the closed end of the battery. FIG. 36B is a plan view of a single piece battery. Looking at the figure from the perimeter and moving into the center is the wall 239 and the first level 238, the second level 237 and the positive contact 236. FIG. 36C is a fragmentary elevation view showing the wall 243, the first level 242, the second level 241 and the positive contact 240.

Figures 37A, 37B:
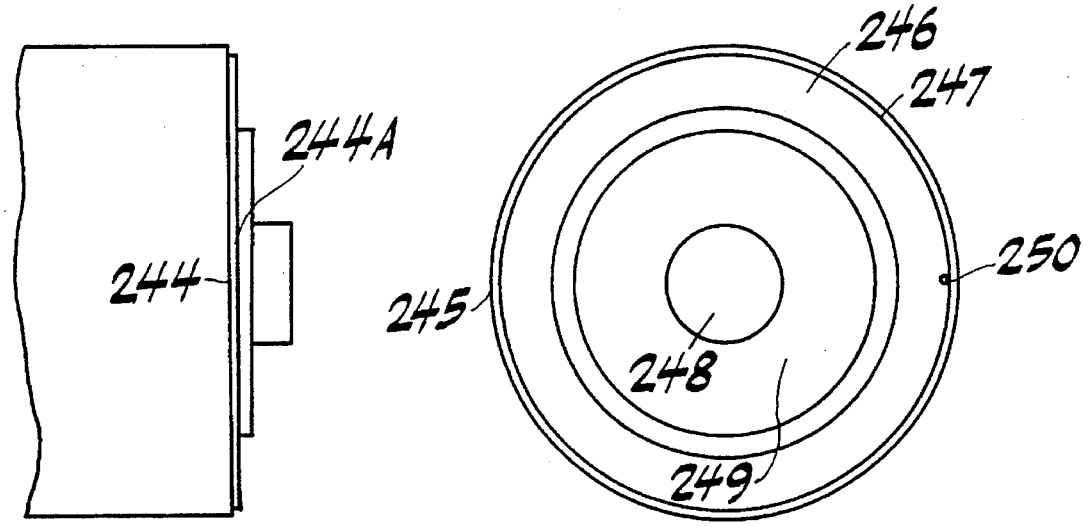
FIG. 37A is a fragmentary elevation view of a single piece battery can with an indicator ring installed.
FIG. 37B is a plan view of a single piece battery can with an indicator ring installed.
Figure 37C:
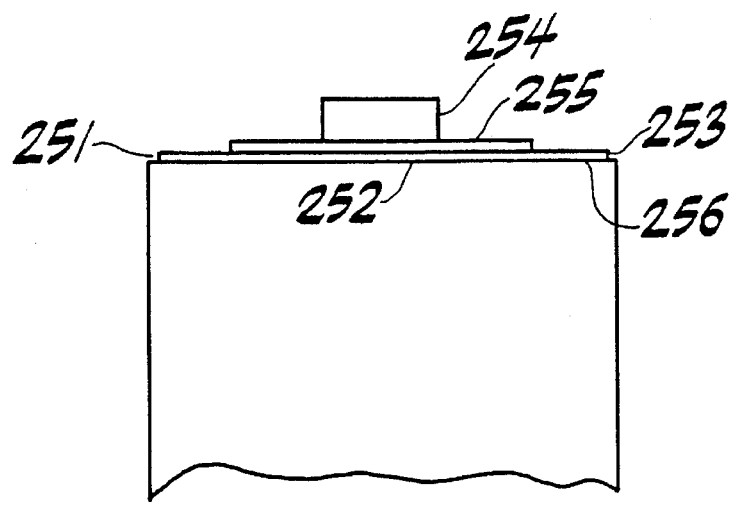
FIG. 37C is a fragmentary elevation view of a single piece battery can with an indicator ring installed.
Figures 38A, 38B:
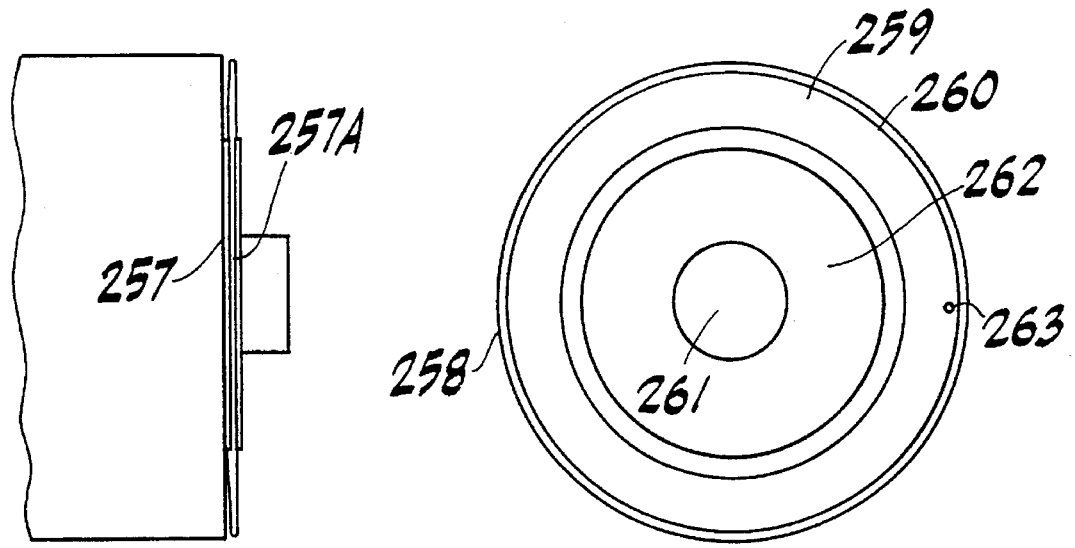
FIG. 38A is a fragmentary elevation view of a discharged single piece battery can with an indicator ring installed.
FIG. 38B is a fragmentary elevation view of a discharged single piece battery can with an idnciator ring installed.
Figure 38C:
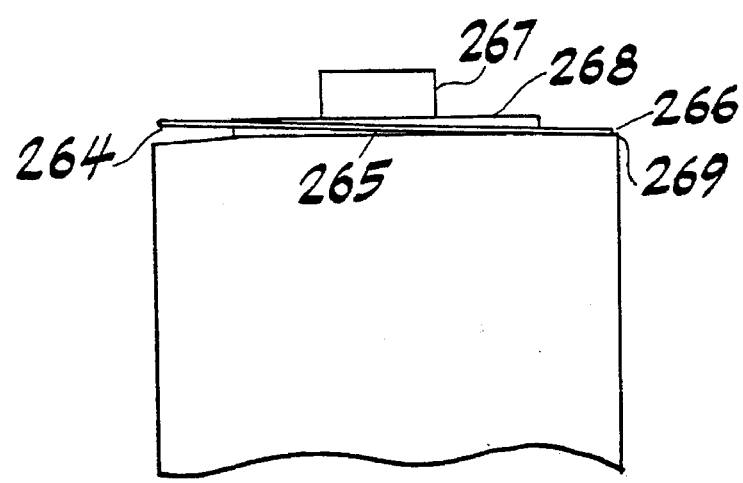
FIG. 38C is a fragmentary elevation view of a discharged single piece battery can with an indicator ring installed.

FIGS. 37A, 37B and 37C are three different views of a fully charged single piece battery can depicting the typical three level shape, formed into the closed end of the battery can with an additional component. FIG. 37A is a fragmentary elevation view of a flat thin washer 244a installed on the surface of the first level 244. FIG. 37B is a plan view of the same single piece battery can showing the flat thin washer 246 installed on the first level 247 by attaching the flat thin washer on the outer perimeter 250. The flat thin washer 246 is open in the center therefore allowing it to lay flat on the first level surface 247 without interfering with the second level 249 or the positive cap 248. The flat thin washer 244A will become an indicating means by being attached in one spot to the first level perimeter 250. Any bulge in the surface will result in movement of the flat thin washer 246 with most of the movement occurring directly opposite 245 the attachment point 250. FIG. 37C is another fragmentary elevation view of the same single piece battery can showing the flat thin washer 252 on the first level 256 which is attached to the perimeter of the first shelf 253. The position of the flat thin washer 252 and the corresponding height of the opposite end of the washer 252 and the corresponding height of the opposite end of the washer 251 is relative to the discharge of the battery. FIGS. 38A, 38B and 38C are three different views of a completely discharged single piece battery can depicting the typical three level shape formed into the closed end of the battery can with the additional flat thin washer.

FIG. 38A is a fragmentary elevation view showing how a completely discharged battery has caused the flat thin washer 257A to rise above the first level surface 257. FIG. 38B is a plan view of the same single piece battery can showing the flat thin washer 259 installed on the first level 260 by attaching the flat thin washer on the outer perimeter 263. The flat thin washer 259 is open in the center, thereby allowing it to rise above the first level surface 260 without interfering with the second level 262 or the positive cap 261. The flat thin washer 259 becomes an indicating means by being attached in one spot to the first level perimeter 260. The discharge bulge in the surface results in movement of the flat thin washer 259 with most of the movement occurring directly opposite 258, the attachment point 263, due to the amplifying effect of mechanical advantage. FIG. 38C is another fragmentary elevation view of the same single piece battery can showing the flat thin washer 265 on the first level 266 which is attached to the perimeter of the first level 269. The flat thin washer 265 is open in the center, thereby allowing it to rise above the first level surface 269 without interfering with the second level 268 or the positive cap 267. The flat thin washer 265 has been raised off the surface of the first level with most of the movement occurring directly opposite 264, the attachment point 266, due to the amplifying effect of mechanical advantage. The position of the flat thin washer 265 and the corresponding height of the opposite end of the washer 264 is relative to the discharge of the battery.

Figure 39A:
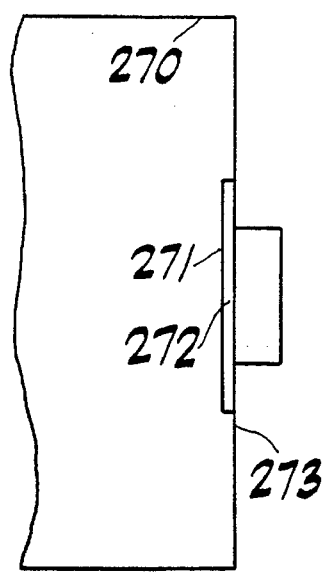
FIG. 39A is a fragmentary elevation view of a new single piece battery can showing an indicator window on label.
Figure 39B:
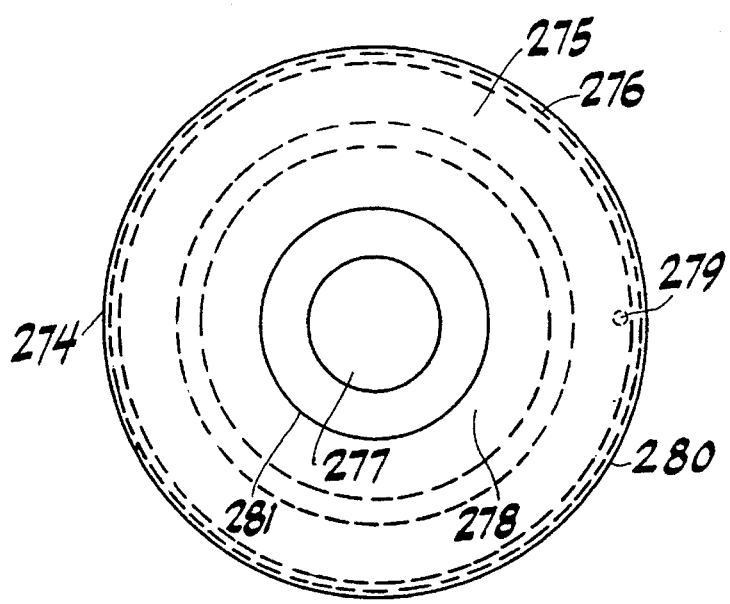
FIG. 39B is a plan view of a single piece battery can showing a label covering indicator ring.
Figure 39C:
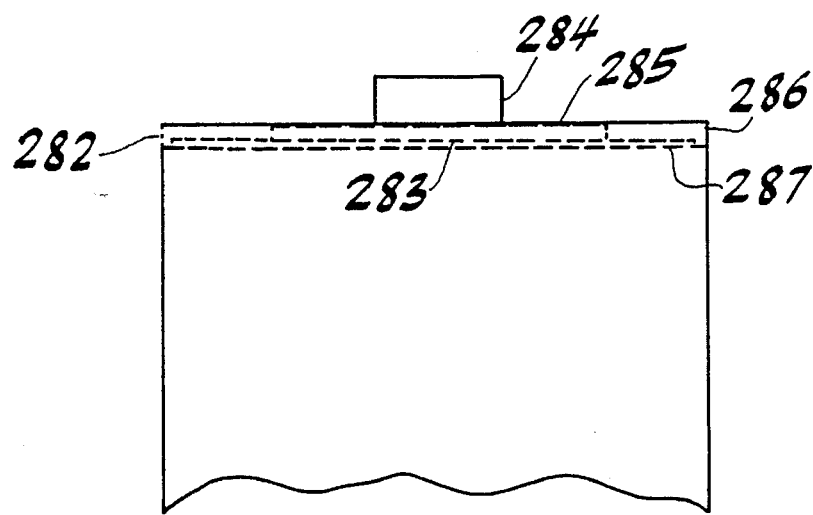
FIG. 39C is another fragmentary elevation view of a new single piece battery can showing a label covering indicator ring.

FIGS. 39A through 42C depict a more formal embodiment of the invention in FIGS. 37A through 38C. In FIGS. 39A, 39B and 39C the battery is fully charged. The indicator is comprised of a flat thin washer 275, 283 that is adhered 279 to the first level 276, 287 which is the area that is part of the perimeter of the closed end of the battery can. A rigid cap 285, 280, 281 is attached to the second level 273, 278, 285 of the closed end of the battery can causing the first level 276, 287 and the flat thin washer 275, 283 to be enclosed within a chamber that is a high as the second level 273, 278, 285 and as wide as the first level. The outer and upper walls of the rigid cap 286, 280, 281 are opaque except for a vertical section 272, 282 directly across from the point where the flat thin washer 275, 283 is attached to the perimeter of the first level surface 279. The size of the aperture 272, 282 is a function of the thickness of the flat thin washer 275, 283 and the diameter of the battery can. The recommended width of the aperture 272, 282 is one third of the diameter of the battery can. The recommended width of the aperture 272, 282 is one third of the diameter of the battery can. The height of the aperture 272, 282 should be the same thickness as the flat thin washer 272, 283. The flat thin washer 275, 283 which is attached to the surface of the first level 279 is flush with the surface. The aperture 272, 282 in this embodiment is above the edge of the flat thin washer 275, 283 which causes the opaque portion 271 below the aperture 272, 282 to hide the edge of the thin flat washer from view. The edge of the flat thin washer 275, 283 can be coated with a bright fluorescent color such as red. When the edge of the flat thin washer 275, 283 can not be seen in the aperture window 272, 282, the indicator denotes a battery that is fully charged.

Figure 40A:
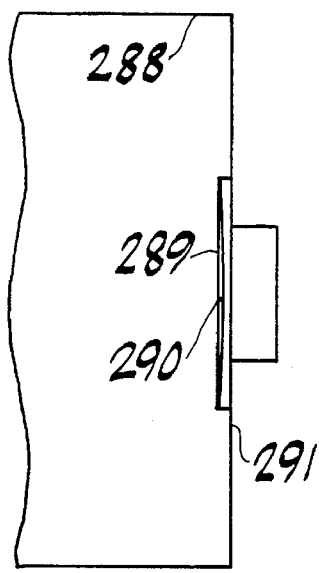
FIG. 40A is a fragmentary elevation view of a partially discharged single piece battery can showing a indicator window on label.
Figure 40B:
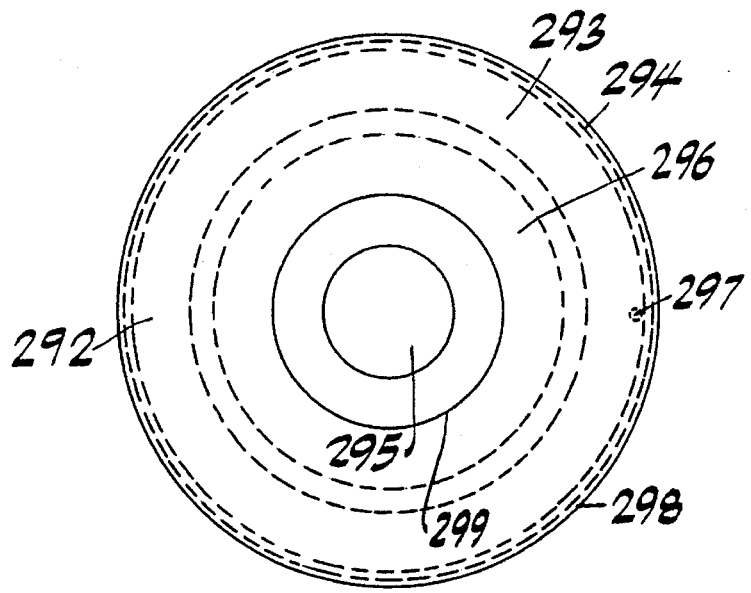
FIG. 40B is a plan view of a partially discharged single piece battery can showing a indicator window on label.
Figure 40C:
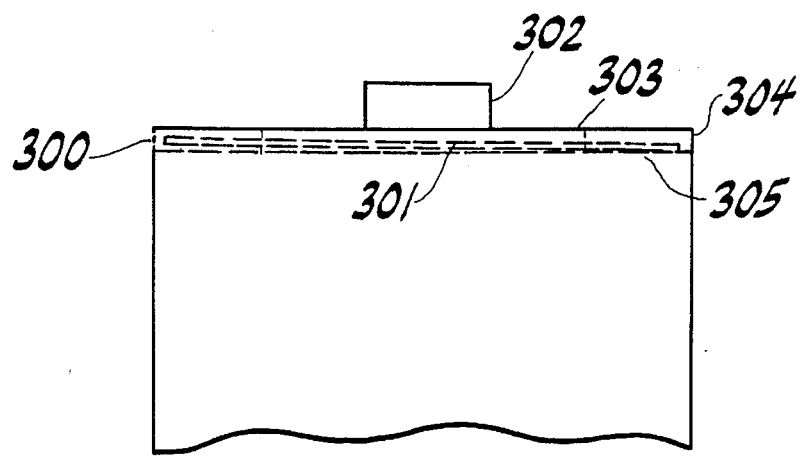
FIG. 40C is a fragmentary elevation view of a partially discharged single piece battery can showing a label covering indicator ring.

FIGS. 40A, 40B and 40C depict the same battery as it begins to discharge. As a result of the discharge of the battery, the surface on the perimeter 294, 305 of the closed end of the battery where the flat thin washer 293, 301 is attached 297 begins to bulge, causing the flat thin washer 293, 301 to pivot which raises the other side 292 of the flat thin washer 293, 301 above the surface of the closed end of the battery. This small movement of the flat thin washer 293, 301 at the pivot or attachment point 297 results in a relatively larger movement at the opposite side 292 of the flat thin washer 293, 301 causing the edge of the flat thin washer 293, 301 to be partially visible in the aperture window 290, 300. When the edge of the flat thin washer 293, 301 can only be seen partially in the aperture window 290, 300 the indicator denotes a battery that is partially discharged.

FIGS. 41A, 41B and 41C depict the same battery as it continues to discharge. As a result of further discharge of the battery, the surface on the perimeter 312, 323 of the closed end of the battery where the flat thin washer 311, 319 is attached, 315 continues to bulge. This causes the flat thin washer 311, 319 to pivot, thereby continuing to raise the other side 310 of the flat thin washer and causing the edge of the flat thin washer to be more visible in the aperture window 308, 318. When the edge of the flat thin washer 311, 319 can be seen substantially discharged.

Figure 42A:
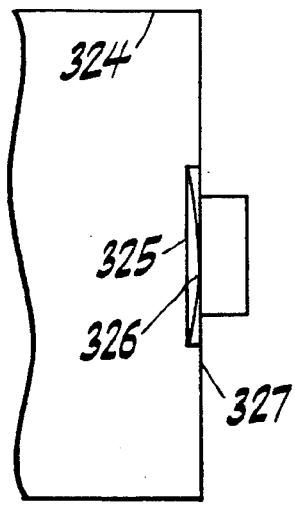
FIG. 42A is a fragmentary elevation view of a completely discharged single piece battery can showing an indicator window on label.
Figure 42B:
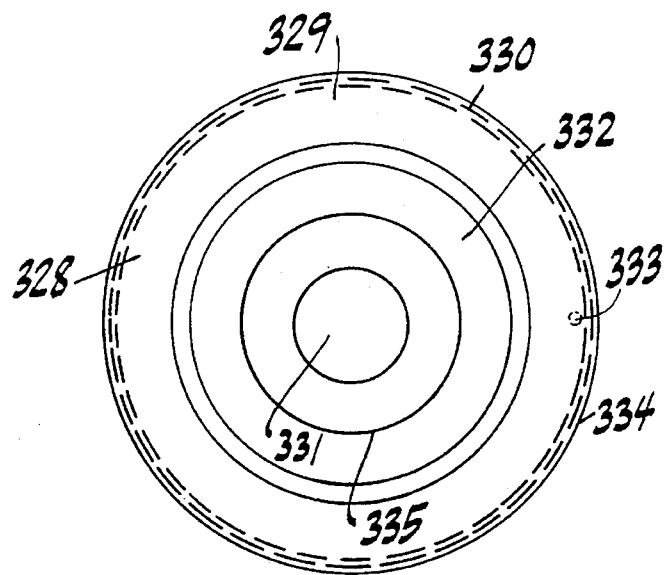
FIG. 42B is a plan view of a completely discharged single piece battery can showing a label covering indicator ring.
Figure 42C:
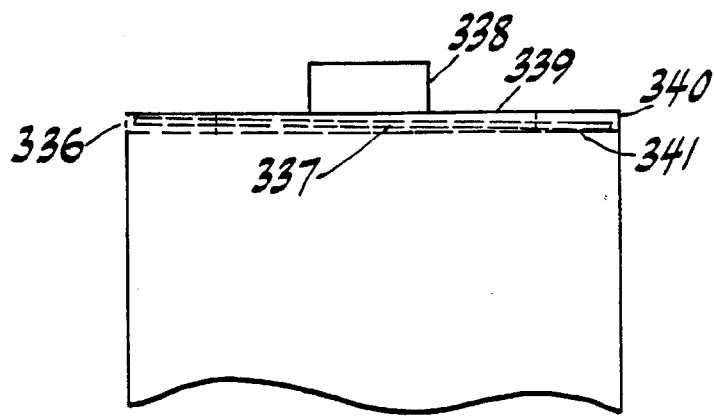
FIG. 42C is another fragmentary elevation view of a completely discharged single piece battery can showing a label covering indicator ring.

FIGS. 42A, 42B and 42C depict the same battery at total discharge. As a result of the total discharge of the battery, the surface on the perimeter 330, 341 of the closed end of the battery where the flat thin washer 329, 337 is attached, 333 reaches a maximum bulge causing the flat thin washer 329, 337 to pivot. This causes the other side 328 of the flat thin washer 329, 337 to rise to a maximum height above the surface of the closed end of the battery. This final small movement of the flat thin washer 329, 337 at the pivot or attachment point 333 results in a final larger movement at the opposite side 328 of the flat thin washer 329, 337 causing the edge of the flat thin washer 329, 337 to be totally visible in the aperture 326, 336. When the edge of the flat thin washer 329, 337 is completely visible in the aperture window 326, 336, the indicator denotes a battery that is completely discharged.

Figure 43A:
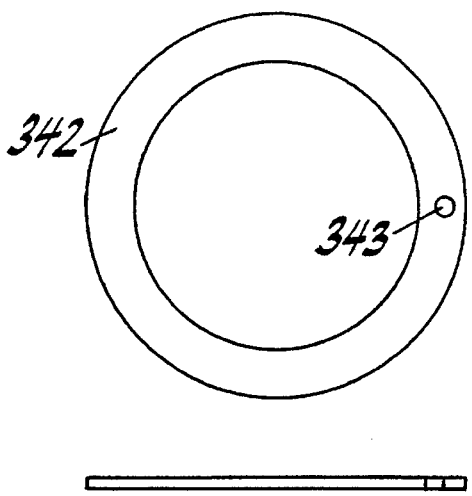
FIG. 43A is a plan and section view of a solid indicator ring.

FIG. 43A is an isolated view of a flat thin washer showing the pivot point 343 and the edge 342 that is visible in the aperture window described in FIGS. 39A through 42C. The washer in FIG. 43A can be metal or plastic with either color coated to plastic with either color coated on to metal or color molded in the plastic.

Figure 43B:
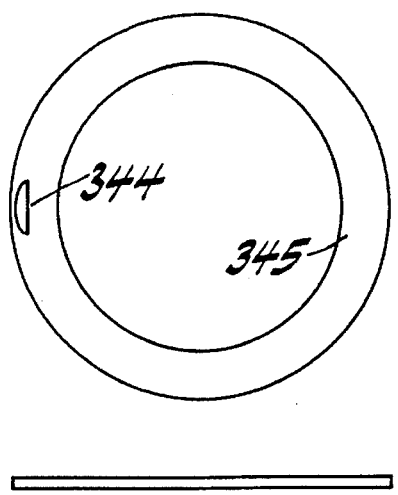
FIG. 43B is a plan and section view of an indicator ring with an aperture.

FIG. 43B is a variation of the flat thin washer which enables viewing from the top instead of the edge. The flat thin washer contains an opening 344 across from the pivot point 345. In this embodiment, the opening 344 lifts above an indica pattern which is printed on the closed end of the steel can. As the opening 344 is raised above the closed end of the steel can, portions of the indicia pattern which initially were hidden are then exposed as the battery discharges.

Figure 43C:
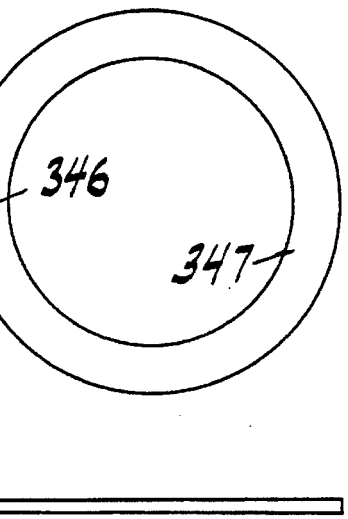
FIG. 43C is a plan and section view of an indicator ring with a lens in the aperture.

FIG. 43C is another variation of the flat thin washer which renders viewing from the top instead of the edge. The flat thin washer contains a thin lens 346 which can lift above an indica patten that is printed on the closed end of the steel can. As the lens 346 is raised above the closed end of the steel can, portions of the indicia pattern which were initially hidden are then exposed as the battery discharges.

Figure 43D:
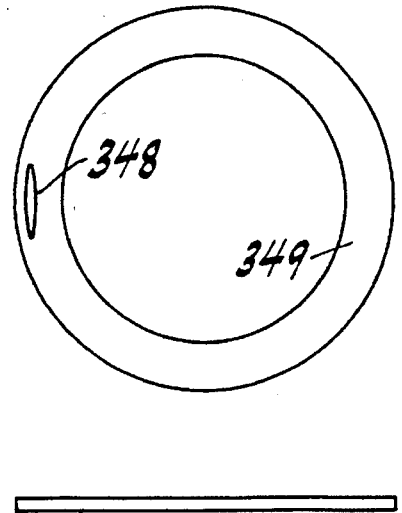
FIG. 43D is a plan and section view of an indicator ring with a translucent film in the aperture.

FIG. 43D is another variation of the flat thin washer which renders viewing from the top instead of the edge. The flat thin washer contains a thin translucent film 350 which is disposed on the bottom of the opening 348 across from the pivot point 349. The thin translucent film 350 is in intimate contact with the closed end of the steel can, which contact is enhanced by means of a non permanent adhesive. The closed end of the steel can may be coated with a dark color which will be visible when the film 350 is in intimate contact with the surface of the closed end of the steel can. As the battery discharges, the flat thin washer pivots at the attachment point 349, thereby raising the opening 348 above the closed end of the steel can. As a result, portions of the film 350 lift off the surface of the can, thereby rendering a contrast between the portion of the film that is in intimate contact and the portion that is not.

Figure 44A:
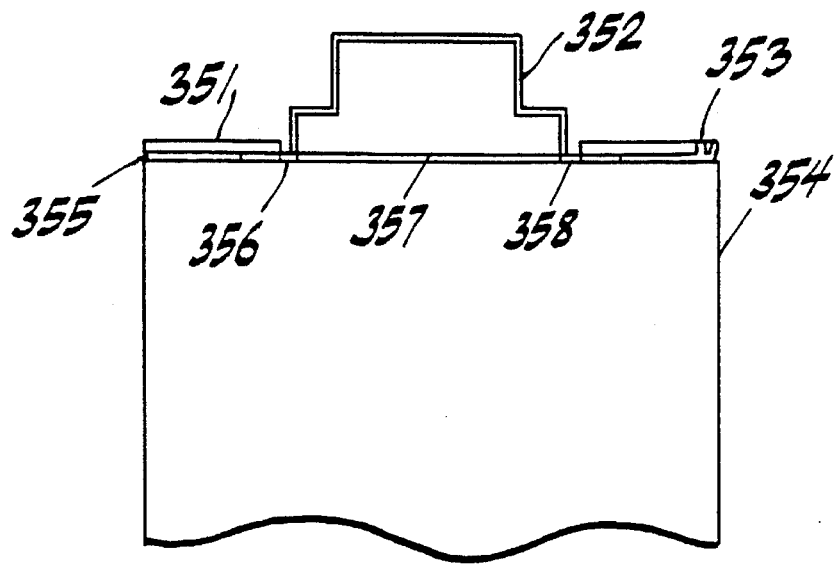
FIG. 44A is a fragmentary section view of a two piece battery with the indicator ring held captive under a dimple in a positive end cap assembly.

FIG. 44A is another variation of the battery charge indicator described in FIGS. 39A through 42C. The embodiment in FIG. 44A is designed for two piece batteries which utilize separate positive end caps as discussed in FIGS. 1 and 17 through 31. The positive end cap is spot welded on the flat surface of the closed end of the battery can. FIG. 44A depicts a combination positive end cap and battery charge indicator. The positive end cap charge indicator is composed of the positive end cap 352 and a flat thin washer 357 that is held down on the surface of the closed end of the battery can by means of a dimple 353 that is shaped into the outer perimeter of the positive end cap 351. The positive end cap indicator is spot welded to the battery surface 356, 358 inside the flat thin washer 357. The spot weld points 356, 358 are raised to a height at least twice the thickness of the flat thin washer creating a cavity for the flat thin washer 357. The lower level of the positive end cap indicator 351 is extended and bent 90 degrees at the perimeter. The length of the extension is the same as the thickness of the flat thin washer which results in a viewing window 355 exposing the edge of the flat thin washer 357. When the battery is fully charged the flat thin washer 357 which has an edge that is coated with a fluorescent ink is totally visible in the viewing window 355. When the battery is fully discharged the flat thin washer 357 pivots at the dimple point 353 causing the edge of the flat thin washer 357 to rise behind the viewing window 355 and disappear from view.

Figure 44B:
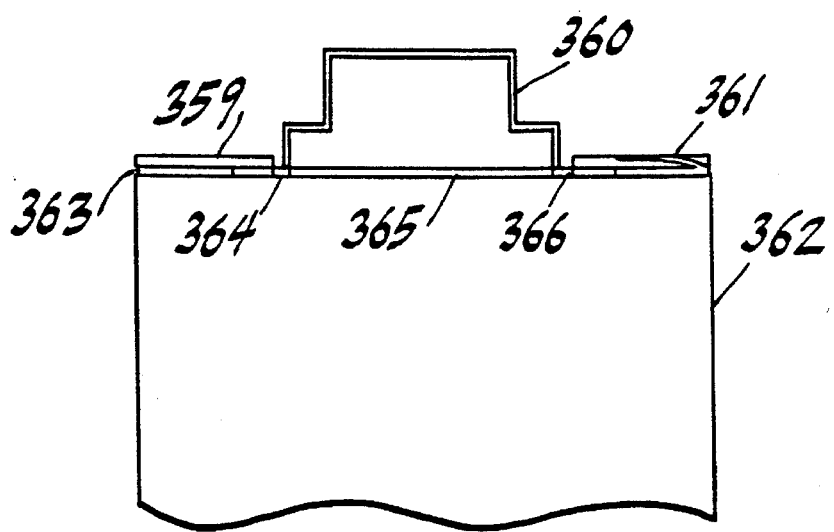
FIG. 44B is a fragmentary section view of a two piece battery with the indicator ring formed of two separate pieces.

FIG. 44B is a variation of the indicator in FIG. 44A. the indicator shown in FIG. 44A is composed of two separate pieces which are the positive end cap 352 and the flat thin washer 357. The indicator in FIG. 44B combines the two pieces by means of a tab 361 that connects the positive end cap 360 with the flat thin washer 365. The tab 361 renders a self contained pivoting hinge that becomes the pivot point for the flat thin washer 365. When the battery is fully charged the flat thin washer 365 which has an edge that is coated with a fluorescent ink is totally visible in the viewing window 363. When the battery is fully discharged the flat thin washer 365 pivots at the hinge point causing the edge of the flat thin washer 365 to rise behind the viewing window and disappear from view.

Figure 45A:
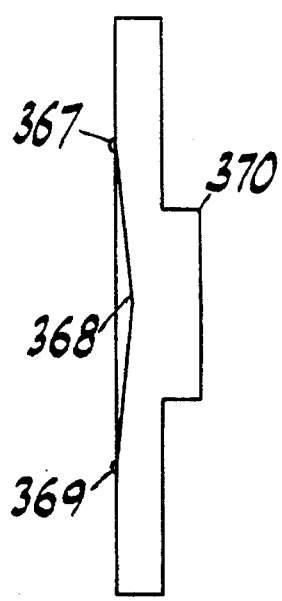
FIG. 45A is an elevation view of a state of charge positive end cap indicator showing an indicator window.

FIGS. 45A through 47C depict a more formal embodiment of the combination positive end cap and flat thin washer indicators shown in FIGS. 44A and 44B. FIGS. 45A, 45B and 45C depict the positive end cap portion of the positive end cap battery charge indicator.

FIG. 45A is an elevation view of the positive end cap showing the positive contact 370, the aperture window 368 and two of the four spot welding points 367, 369. The cap is shown in black to enhance the contrast with the aperture window 368.

Figure 45B:
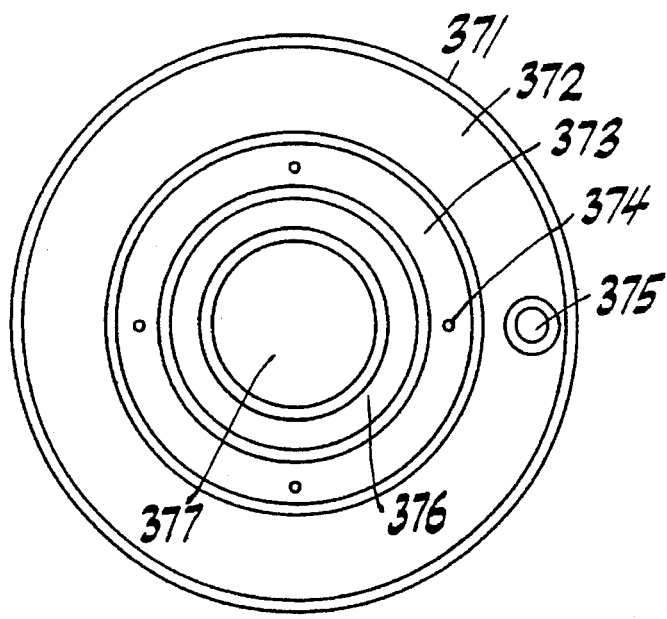
FIG. 45B is a plan view of a state of charge positive end cap indicator.

FIG. 45B is a plan view of the positive end cap showing the side wall 371, the first level 372, the flat thin washer positioning dimple 375, the reinforcement gutter 373, spot welding point 374, the inner first level 376, and the positive contact 377.

Figure 45C:
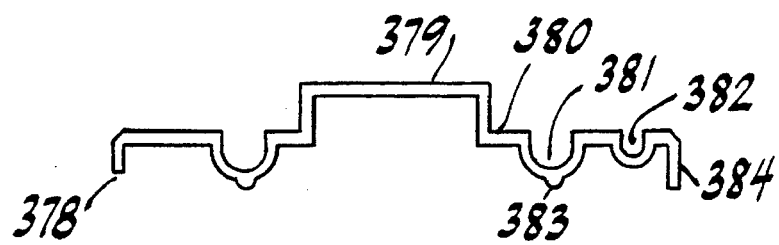
FIG. 45C is a cross section view of a state of charge positive end cap indicator.

FIG. 45C is an elevation cross sectional view of the positive end cap showing the side wall 384, the flat thin washer positioning dimple 382, the reinforcement gutter 381, a spot welding point 383, the inner first level 380, the positive contact and the aperture location 378.

Figure 46A:
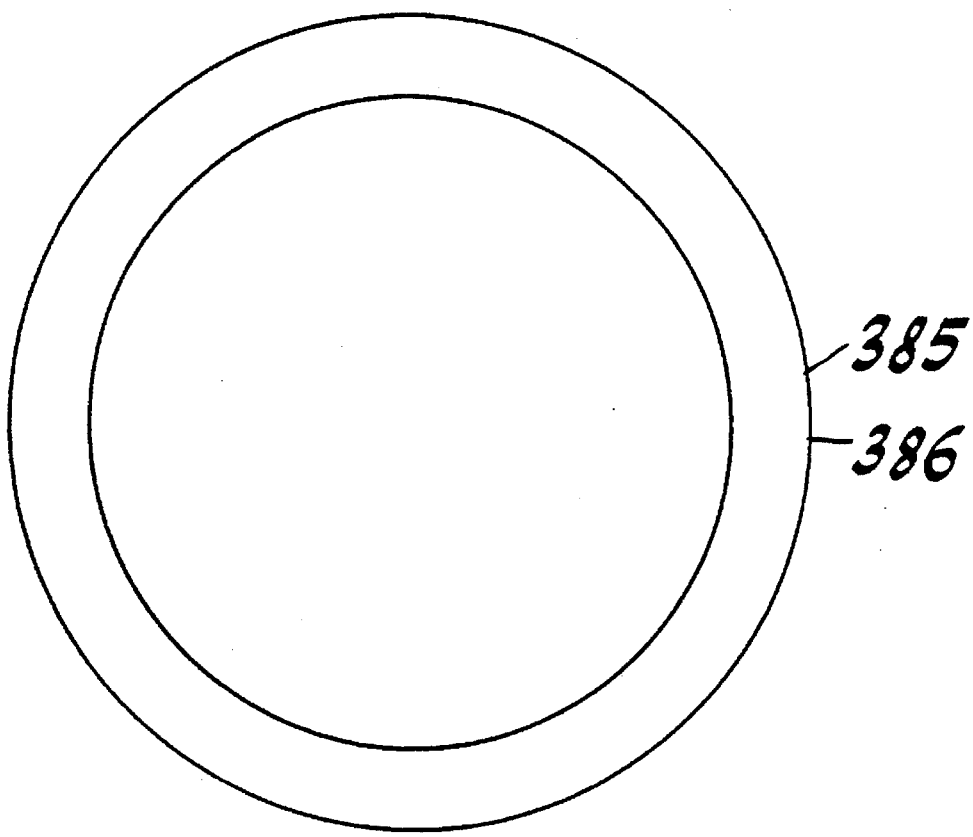
FIG. 46A is a plan view of a state of charge indicator ring.
Figure 46B:
FIG. 46B is a section view of a state of charge indicator ring.

FIGS. 46A, and 46B depict the flat thin washer portion of the positive end cap battery charge indicator. FIG. 46A is a plan view showing the flat thin washer 386 and the edge of the circumference 385. FIG. 46B is an elevation cross section showing the flat thin washer with a height and width 387 related tot he proportions of the positive end cap shown in FIGS. 45A, 45B and 45C.

FIGS. 47A, 47B and 47C depict the assembled positive end cap battery charge indicator composed of the positive contact section in FIGS. 45A, 45B and 45C and the flat thin washer section FIGS. 46A and 46B. The positive end cap battery charge indicator is installed on a fully charged battery.

FIG. 47A is an elevation view of the assembled positive end cap battery charger showing the flat thin washer 389 inside the positive end cap contact 391. Also shown are two of the four spot weld points 388, 390 and the aperture window displaying the edge of the flat thin washer 389.

FIG. 47B is a plan view of the assembled positive end cap battery charge indicator showing the flat thin washer 393 under the positive end cap contact. The flat thin washer is under the positioning dimple 397 and the first level 393. Also shown is the reinforcement gutter 395, the inner first level 398 and the positive contact 399.

FIG. 47C is a fragmentary section view of the assembled positive end cap battery charge indicator. The positive end cap is installed on a fully charged battery 407 by means of spot welds 406A, 406B which renders a chamber that encloses the flat thin washer 408 on the perimeter surface 405 of the battery 407. The flat thin washer 408 is held against the perimeter surface 405 of the battery 407 at a point under the positioning dimple 402. This becomes the pivoting point for the flat thin washer 408. Since the aperture 404 is cut directly across from the positioning dimple 402 in the positive end cap and the dimple it will position the washer anywhere along the top of the washer surface since there is no registration required to insure that the flat thin washer edge in the viewing window 404 is directly across from the pivot point 405. The flat thin washer 408 will be flush with the surface of the battery 407 since the battery is fully charged and there is no bulge in the perimeter surface 405. The edge of the flat thin washer 408 will not be flush with the surface of the battery 407 if the battery is fully discharged since the discharge bulge in the perimeter surface 405 will cause the flat thin washer to pivot under the dimple 402 and be raised above the aperture window 404 making the colored edge invisible, thereby indicating a totally discharged battery.

FIGS. 48A through 48C is a variation of the formal embodiment shown in FIGS. 45A through 47C. In FIG. 48A the aperture window 410 is wider in size and rectangular in shape. The spot weld projections 408, 409, 411 and 412 are now located on the edge of the wall 413 which allows the positive end cap to be attached to the outer most perimeter of the battery. FIG. 48B is a plan view of the embodiment showing the location of the spot weld projections 414, 415, 516, 417, the positioning dimple 418 and the reinforcement gutter 417. FIG. 48C is a cross section view of the embodiment showing the aperture window 419, the positioning dimple 421 and the reinforcement gutter 420 which is now the same depth as the positioning dimple 421 which insures that the positive cap will never lift off the surface of the battery.

The indicators described in this document accurately display the true state of charge or energy remaining in the alkaline battery in which they are installed. The indicators express a chemical reaction that has or has not occurred in the alkaline battery. The indicators described in this application are able to detect partial discharges more accurately than the standard indicators or testers which use current or voltage to determine the condition of the battery. If an alkaline battery is discharged continuously by means of a high resistance load in which a low current is extracted over a long period of time, a voltage measurement taken any time during the discharge will give a reasonable indication of the charge remaining. In most cases however batteries are discharged under many different loads an many different time intervals. An example of this would be if an alkaline battery is discharged with a low resistance load causing the battery to deliver high current for a relatively short time. If a one ohm resistor is placed across a new alkaline battery a current of one amp or more is generated. After battery no longer delivers the high current, it is removed from the load and measured with a tester based on voltage. The tester will indicate that the battery is totally depleted in that the voltage will be below 0.850 volts. If this same battery has an indicator such as the indicator in FIGS. 39A through 42C, the indicator will show a partial discharge instead of a complete discharge. The reason for this is that the battery is not totally discharged event though the voltage battery tester indicated that is was. If the battery is put aside for a period of time, the battery will partially rejuvenate. This partial rejuvenation of the battery allows the voltage to return to a level somewhere below the starting point of 1.55 volts and above the end point of 0.850 volts. The battery charge indicator in FIGS. 39A through 42C correctly indicated this even before the battery had time to rest. The battery tester based on voltage will indicate a partial discharge only after the battery has had time to rest. As a result of the earlier incorrect reading based on a voltage tester, a premature disposal of the battery may result. As a result of the earlier correct reading based on an indicator in FIGS. 39A through 42C, a premature disposal of the battery may be prevented.

What is claimed is:

1. A battery charge indicator for a battery including a can having a wall portion and an end portion, the periphery of the end portion being attached to one end of the wall portion to close the can, the can having an internally contained chemical cathode and anode for generating an electrical current when connected to one another through an external load, the cathode expanding in an amount proportional to the amount of electrical energy delivered by the battery, the expansion of the cathode when applying pressure to the inner surface of the end portion of the can causing the periphery of the end portion to deflect outwardly with respect to the interior of the can and the wall portion adjacent to the periphery of the end portion of the can, and an indicating element having a portion mounted on the periphery of the end portion of the can and extending with respect to the end portion adjacent to the periphery of the end portion of the can, the indicating element moving away from the end portion of the can in response to the outward deflection of the periphery of the end portion of the can when the battery is being discharged, the magnitude of the movement of the indicating element being a function of the degree of discharge of the battery.

2. A battery charge indicator in accordance with claim 1 in which the wall portion of the can of the battery has a circular cross-section and the end portion of the can which is adapted to deflect outwardly with respect to the interior of the can in response to the expansion of the cathode being circular in form at the periphery thereof which is attached to the one end of the wall portion of the can.

3. A battery charge indicator in accordance with claim 1 in which the end portion of the can of the battery is formed as a diaphragm which causes the periphery of the end portion of the can to deflect outwardly from the interior of the can in response to the expansion of the cathode against the end portion.

4. A battery charge indicator in accordance with claim 3 in which the diaphragm of the end portion of the can comprises a central flat portion with the periphery of the end portion of the can supporting the central flat portion with respect to the one end of the wall portion of the can to which the periphery of the end portion of the can is attached, the periphery being flexible to enable the periphery to deflect away from the interior of the can in response to the expansion of the cathode against the flat central portion and the periphery of the end portion.

5. A battery charge indicator in accordance with claim 4 in which the flexible periphery comprises a plurality of cirucumferential corrugations.

6. A battery charge indicator in accordance with claim 1 in which the periphery of the end portion deflects outwardly with respect to the interior of the can in a curvilinear form extending from the wall portion of the can.

7. A battery charge indicator in accordance with claim 6 in which the curvilinear form of the deflection of the periphery with respect to the wall portion of the can is a parabolic form.

8. A battery charge indicator in accordance with claim 1 in which the indicating element extends with respect to a portion of the end portion of the can.

9. A battery charge indicator in accordance with claim 8 in which the indicating element extends with respect to a minor fraction of the end portion of the can.

10. A battery charge indicator in accordance with claim 1 in which the indicating element is in the form of a strip with an end thereof mounted adjacent the periphery of the end portion.

11. A battery charge indicator in accordance with claim 10 in which the indicating element in the form of a strip has an open viewing slot extending along its length from the portion thereof mounted on the periphery of the end portion of the can, the appearance within the open viewing slot changing with the outward deflection of the strip to indicate the state of charge of the battery.

12. A battery charge indicator in accordance with claim 11 which the open viewing slot has a translucent layer attached to the surface of the strip adjacent to the end portion of the can, one side of the translucent layer opposite the strip being in contact with the end portion of the can when the battery is charged, the one side of the translucent layer progressively losing contact with the end portion of the can as the strip is deflected and progressively changing the appearance of the translucent layer in the open viewing slot.

13. A battery charge indicator in accordance with claim 12 in which the side of the translucent layer opposite the strip has a non-permanent adhesive progressively losing contact with the end portion of the can with the discharge of the battery and thereby progressively changing the appearance of the translucent layer in the open viewing slot.

14. A battery charge indicator in accordance with claim 11 which the open viewing slot has a translucent layer attached to a surface of the strip, the translucent layer bearing indicia in the open viewing slot and being in contact with the end portion of the can when the battery is charged, the one side of the translucent layer progressively losing contact with the end portion of the can as the strip is deflected and progressively changing the appearance of the indicia of the translucent layer in the open viewing slot.

15. A battery charge indicator in accordance with claim 11 in which the end portion of the can bears indicia and in which the open viewing slot has a layer forming a lens attached to the strip, the translucent layer bearing indicia in the open viewing slot and being in contact with the end portion of the can when the battery is charged, when the battery is being discharged the lens progressively losing contact with the end portion of the can as the strip is deflected and progressively changing the focus of the lens on the indicia.

16. A battery charge indicator in accordance with claim 11 which the end portion of the can bears a film of color material and the open viewing slot has a translucent layer of colored material attached to the strip, the translucent layer being in contact with the film of color material on the end portion of the can when the battery is charged, the one side of the translucent layer progressively losing contact with the end portion of the can as the strip is deflected and progressively changing the appearance of the color of the translucent layer with respect to the film of color material on the end portion of the can.

17. A battery charge indicator in accordance with claim 1 in which the indicating element is in the form of a ring having an open central portion, the ring having a circumference extending adjacent the periphery of the end portion of the can, a portion of the ring being mounted on the periphery of the end portion of the can, the appearance of the ring with respect to the end portion of the can changing with the outward deflection of the ring to indicate the state of charge of the battery.

18. A battery charge indicator in accordance with claim 17 in which the ring has an opening and a translucent layer attached to the opening, the translucent layer being in contact with the end portion of the can when the battery is charged, the translucent layer in the opening progressively losing contact with the end portion of the can as the ring is deflected and progressively changing the appearance of the translucent layer in the opening and indicating the state of charge of the battery.

19. A battery charge indicator in accordance with claim 1 in which the indicating element is in the form of a ring having an open central portion, the ring having a circumference extending adjacent the periphery of the end portion of the can, a portion of the ring being mounted on the periphery of the end portion of the can, structure overlying the ring and the end portion of the can forming a chamber about the ring, the chamber having a window disposed in the periphery of the chamber adjacent the circumference of the ring, the deflection of a portion of the ring with respect to the window being a function of the discharge of the battery.

20. A method of indicating the charge of a battery having a can with a wall portion and an end portion, the periphery of the end portion being attached to one end of the wall portion to close the can, the can having an internally contained chemical cathode and anode for generating an electrical current when connected to one another through an external load, the cathode expanding in an amount proportional to the amount of electrical energy delivered by the battery, the expansion of the cathode when applying pressure to the inner surface of the end portion of the can causing the periphery of the end portion to deflect outwardly with respect to the interior of the can and the wall portion adjacent to the periphery of the end portion, and an indicating element having a portion mounted on the periphery of the end portion and extending with respect to the end portion adjacent to the periphery of the end portion, the method comprising the steps of enabling the indicating element to move away from the end portion in response to the outward deflection of the periphery of the end portion when the battery is being discharged and observing the magnitude of the movement of the indicating element as a function of the degree of discharge of the battery.

21. A method in accordance with claim 19 in which the indicating element is in the form of a strip having an open viewing slot extending along its length from the portion thereof mounted on the periphery of the end portion of the can, the method including observing the changing of the appearance within the open viewing slot with the outward deflection of the strip to indicate the state of charge of the battery.

22. A method in accordance with claim 19 in which the indicating element is in the form of a ring having an open central portion, the ring having a circumference extending adjacent the periphery of the end portion of the can, the method comprising observing the appearance of the ring with respect to the end portion of the can changing with the outward deflection of the ring to indicate the state of charge of the battery.

23. A method in accordance with claim 20 in which the indicating element is in the form of a ring having an open central portion, the ring having a circumference extending adjacent the periphery of the end portion of the can, a portion of the ring being mounted on the periphery of the end portion of the can, structure overlying the ring and the end portion of the can forming a chamber about the ring, the chamber having a window disposed in the periphery of the chamber adjacent the circumference of the ring, the method comprising observing the deflection of a portion of the ring with respect to the window as a function of the discharge of the battery.

24. A method in accordance with claim 23 in which the indicating element is in the form of a ring having an opening and a translucent layer attached to the opening, the translucent layer being in contact with the end portion of the can when the battery is charged, the method comprising observing the translucent layer in the opening progressively losing contact with the end portion of the can as the ring is deflected and progressively changing the appearance of the translucent layer in the opening to indicate the state of charge of the battery.

* * * * *